(12) United States Patent
Suzuki et al.

(10) Patent No.: US 9,780,941 B2
(45) Date of Patent: Oct. 3, 2017

(54) TERMINAL DEVICE, INTEGRATED CIRCUIT, AND RADIO COMMUNICATION METHOD

(71) Applicant: Sharp Kabushiki Kaisha, Osaka-shi, Osaka (JP)

(72) Inventors: Shoichi Suzuki, Osaka (JP); Toshizo Nogami, Osaka (JP); Tatsushi Aiba, Osaka (JP); Kazunari Yokomakura, Osaka (JP)

(73) Assignee: Sharp Kabushiki Kaisha, Sakai (TW)

( * ) Notice: Subject to any disclaimer, the term of this patent is extended or adjusted under 35 U.S.C. 154(b) by 4 days.

(21) Appl. No.: 14/781,646

(22) PCT Filed: Mar. 24, 2014

(86) PCT No.: PCT/JP2014/058120
§ 371 (c)(1),
(2) Date: Oct. 1, 2015

(87) PCT Pub. No.: WO2014/162914
PCT Pub. Date: Oct. 9, 2014

(65) Prior Publication Data
US 2016/0065350 A1     Mar. 3, 2016

(30) Foreign Application Priority Data

Apr. 4, 2013  (JP) ................................. 2013-078307

(51) Int. Cl.
*H04L 5/00*     (2006.01)
*H04W 28/18*   (2009.01)
(Continued)

(52) U.S. Cl.
CPC .......... *H04L 5/0057* (2013.01); *H04L 1/1816* (2013.01); *H04L 1/1854* (2013.01);
(Continued)

(58) Field of Classification Search
CPC ...................................................... H04L 5/0057
See application file for complete search history.

(56) References Cited

U.S. PATENT DOCUMENTS

2014/0301256 A1\* 10/2014 Yao ....................... H04L 5/0091
370/280

OTHER PUBLICATIONS

Official Communication issued in International Patent Application No. PCT/JP2014/058120, mailed on Jun. 24, 2014.
(Continued)

*Primary Examiner* — John Blanton
(74) *Attorney, Agent, or Firm* — Keating & Bennett, LLP

(57) ABSTRACT

A terminal device includes: a setting unit that sets resources used to calculate a channel quality indicator; a reception unit that monitors a physical downlink control channel accompanied with information indicating an uplink-downlink configuration; a measurement unit that performs interference measurement to calculate the channel quality indicator based on the resource excluding at least the resource in an uplink subframe which is based on the uplink-downlink configuration; and transmission unit that transmits the channel quality indicator via a physical uplink shared channel. The transmission unit adjusts transmission with the physical uplink shared channel to which a physical downlink control channel accompanied with an uplink grant corresponds in subframe n+k based on detection of the physical downlink control channel accompanied with the uplink grant in subframe n. The setting unit sets a second uplink-downlink configuration. Here, k is given based on the second uplink-downlink configuration.

4 Claims, 18 Drawing Sheets

(51) Int. Cl.
*H04L 1/18* (2006.01)
*H04L 5/14* (2006.01)
*H04W 24/06* (2009.01)

(52) U.S. Cl.
CPC .............. *H04L 5/0051* (2013.01); *H04L 5/14* (2013.01); *H04W 24/06* (2013.01); *H04W 28/18* (2013.01); *H04L 5/0048* (2013.01)

(56) References Cited

OTHER PUBLICATIONS

Ericsson et al., "On standardization impact of TDD UL-DL adaptation" 3GPP TSG-RAN WG1 #69, R1-122016, May 21-25, 2012, pp. 1-3.
Ericsson et al., "Signalling support for dynamic TDD", 3GPP TSG-RAN WG1 #72, R1-130558, Jan. 28-Feb. 1, 2013, 3 pages.
Coolpad, "Backward compatibility and potential reconfiguration gain for legacy UE", 3GPP TSG RAN WG1 Meeting #72, R1-130654, Jan. 28-Feb. 1, 2013, pp. 1-4.
LG Electronics, "Considerations on TDD UL-DL reconfigurations", 3GPP TSG RAN WG1 Meeting #72, R1-130262, Jan. 28-Feb. 1, 2013, pp. 1-4.
NEC Group, "Reconfiguration signalling and HARQ-timing for TDD eIMTA system", 3GPP TSG RAN WG1 Meeting #72, R1-130370, Jan. 28-Feb. 1, 2013, pp. 1-3.

\* cited by examiner

FIG. 9

| UPLINK-DOWNLINK CONFIGURATION | DOWNLINK-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 12

| SET # | (PRIMARY CELL UL-DL CONFIGURATION, SECONDARY CELL UL-DL CONFIGURATION) | SECONDARY CELL SECOND UPLINK REFERENCE UL-DL CONFIGURATION |
|---|---|---|
| SET 1 | (1,1),(1,2),(1,4),(1,5) | 1 |
| | (2,2),(2,5) | 2 |
| | (3,3),(3,4),(3,5) | 3 |
| | (4,4),(4,5) | 4 |
| | (5,5) | 5 |
| SET 2 | (1,0),(2,0),(3,0),(4,0),(5,0),(6,0) | 0 |
| | (2,1),(4,1),(5,1) | 1 |
| | (5,2) | 2 |
| | (4,3),(5,3) | 3 |
| | (5,4) | 4 |
| | (1,6),(2,6),(3,6),(4,6),(5,6) | 6 |
| SET 3 | (3,1) | 1 |
| | (3,2),(4,2) | 2 |
| | (1,3),(2,3) | 3 |
| | (2,4) | 4 |
| SET 4 | (0,0),(6,0) | 0 |
| | (0,1),(0,2),(0,4),(0,5),(6,1),(6,2),(6,5) | 1 |
| | (0,3),(0,6) | 3 |
| | (6,4) | 4 |
| | (0,6),(6,6) | 6 |

FIG. 14

| SET # | (PRIMARY CELL UL-DL CONFIGURATION, SECONDARY CELL UL-DL CONFIGURATION) | SECONDARY CELL SECOND UPLINK REFERENCE UL-DL CONFIGURATION |
|---|---|---|
| SET 1 | (0,0) | 0 |
| | (1,0),(1,1),(1,6) | 1 |
| | (2,0),(2,2),(2,1),(2,6) | 2 |
| | (3,0),(3,3),(3,6) | 3 |
| | (4,0),(4,1),(4,3),(4,4),(4,6) | 4 |
| | (5,0),(5,1),(5,2),(5,3),(5,4),(5,5),(5,6) | 5 |
| | (6,0),(6,6) | 6 |
| SET 2 | (0,1),(6,1) | 1 |
| | (0,2),(1,2),(6,2) | 2 |
| | (0,3),(6,3) | 3 |
| | (0,4),(1,4),(3,4),(6,4) | 4 |
| | (0,5),(1,5),(2,5),(3,5),(4,5),(6,5) | 5 |
| | (0,6) | 6 |
| SET 3 | (3,1),(1,3) | 4 |
| | (3,2),(4,2),(2,3),(2,4) | 5 |
| SET 4 | (0,1),(02),(0,3),(0,4),(0,5),(0,6) | 0 |
| | (1,2),(1,4),(1,5) | 1 |
| | (2,5) | 2 |
| | (3,4),(3,5) | 3 |
| | (4,5) | 4 |
| | (6,1),(6,2),(6,3),(6,4),(6,5) | 6 |
| SET 5 | (1,3) | 1 |
| | (2,3),(2,4) | 2 |
| | (3,1),(3,2) | 3 |
| | (4,2) | 4 |

FIG. 15

| CONDITION | FIRST UPLINK REFERENCE UL-DL CONFIGURATION | FIRST DOWNLINK REFERENCE UL-DL CONFIGURATION |
|---|---|---|
| (a) | D | D |
| (b) | U | U or D |
| (c) | S | S or D |

FIG. 16

| CONDITION | FIRST UPLINK REFERENCE UL-DL CONFIGURATION | FIRST DOWNLINK REFERENCE UL-DL CONFIGURATION | TRANSMISSION DIRECTION UL-DL CONFIGURATION |
|---|---|---|---|
| (d) | D | D | D |
| (e) | U | U | U |
| (f) | U | D | U or D |
| (g) | S | S | S |
| (h) | S | D | S or D |

FIG. 17

| FIRST UPLINK REFERENCE UL-DL CONFIGURATION | FIRST DOWNLINK REFERENCE UL-DL CONFIGURATION | TRANSMISSION DIRECTION UL-DL CONFIGURATION |
|---|---|---|
| 0 | 0 | − (0) |
| 0 | 1 | 0, 1, 6 |
| 0 | 2 | 0, 1, 2, 6 |
| 0 | 3 | 0, 3, 6 |
| 0 | 4 | 0, 1, 3, 4, 6 |
| 0 | 5 | 0, 1, 2, 3, 4, 5, 6 |
| 0 | 6 | 0, 6 |
| 1 | 1 | − (1) |
| 1 | 2 | 1, 2 |
| 1 | 4 | 1, 4 |
| 1 | 5 | 1, 2, 4, 5 |
| 2 | 2 | − (2) |
| 2 | 5 | 2, 5 |
| 3 | 3 | − (3) |
| 3 | 4 | 3, 4 |
| 3 | 5 | 3, 4, 5 |
| 4 | 4 | − (4) |
| 4 | 5 | 4, 5 |
| 5 | 5 | − (5) |
| 6 | 6 | − (6) |
| 6 | 1 | 1, 6 |
| 6 | 2 | 1, 2, 6 |
| 6 | 3 | 3, 6 |
| 6 | 4 | 1, 3, 4, 6 |
| 6 | 5 | 1, 2, 3, 4, 5, 6 |

FIG. 18

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 |   |   |   | 4 | 6 |   |   |   |
| 1 |   | 6 |   |   | 4 |   | 6 |   |   | 4 |
| 2 |   |   |   | 4 |   |   |   |   | 4 |   |
| 3 | 4 |   |   |   |   |   |   |   | 4 | 4 |
| 4 |   |   |   |   |   |   |   |   | 4 | 4 |
| 5 |   |   |   |   |   |   |   |   | 4 |   |
| 6 | 7 | 7 |   |   |   | 7 | 7 |   |   | 5 |

FIG. 19

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 |   |   |   | 7 | 4 |   |   |   |
| 1 |   | 4 |   |   | 6 |   | 4 |   |   | 6 |
| 2 |   |   |   | 6 |   |   |   |   | 6 |   |
| 3 | 6 |   |   |   |   |   |   |   | 6 | 6 |
| 4 |   |   |   |   |   |   |   |   | 6 | 6 |
| 5 |   |   |   |   |   |   |   |   | 6 |   |
| 6 | 6 | 4 |   |   |   | 7 | 4 |   |   | 6 |

FIG. 20

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 21

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

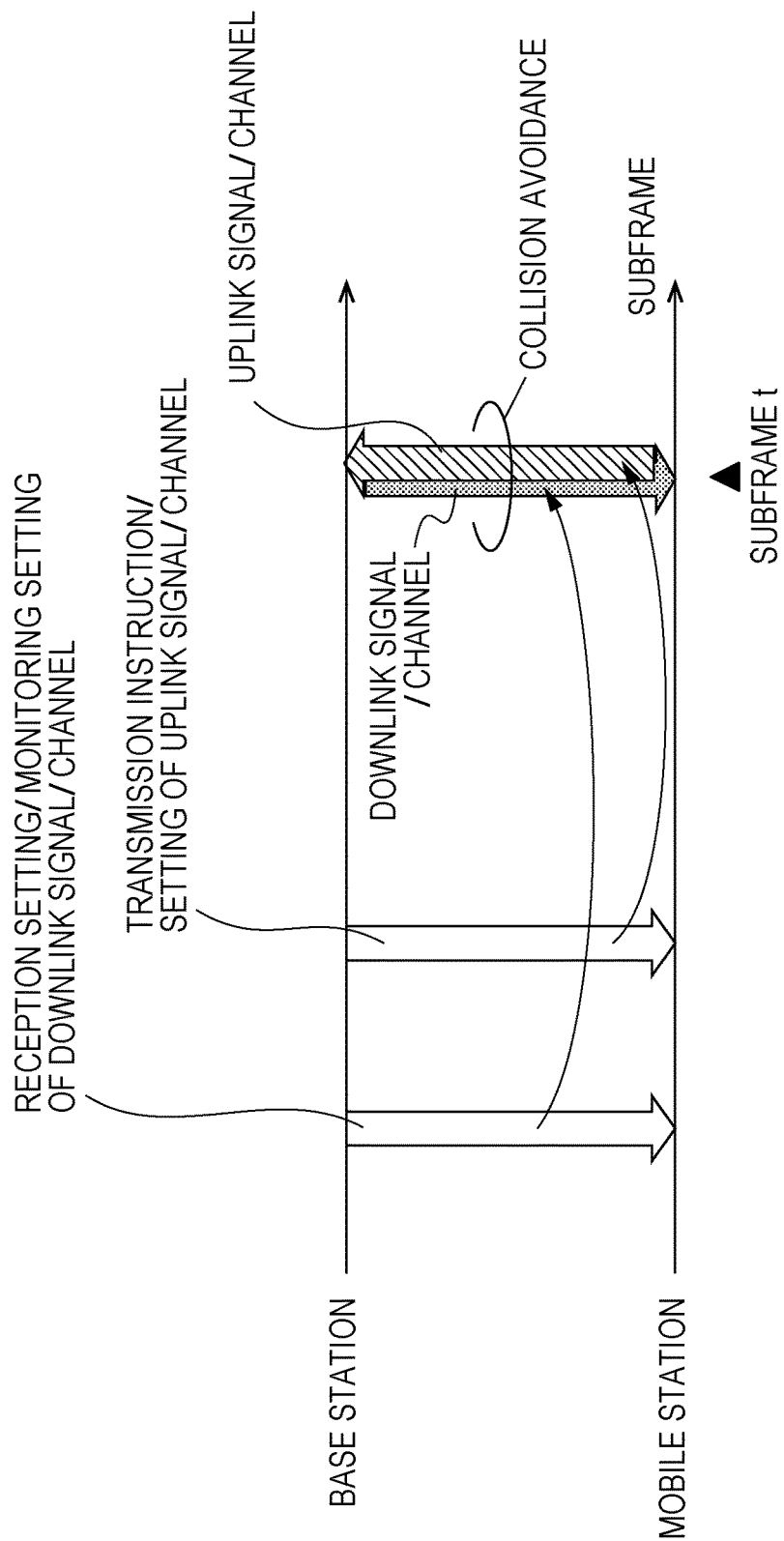

TERMINAL DEVICE, INTEGRATED CIRCUIT, AND RADIO COMMUNICATION METHOD

TECHNICAL FIELD

The present invention relates to a terminal device integrated circuit, and a radio communication method.

BACKGROUND ART

Radio access schemes and radio networks (hereinafter referred to as "Long Term Evolution (LTE)" or "Evolved Universal Terrestrial Radio Access (EUTRA)") of cellular mobile communication have been examined in 3rd Generation Partnership Project (3GPP). In LTE, an Orthogonal Frequency Division Multiplexing (OFDM) scheme is used as a downlink communication scheme. In LTE, a Single-Carrier Frequency Division Multiple Access (SC-FDMA) scheme is used as an uplink communication scheme. In LTE, a base station device is referred to as an evolved NodeB (eNodeB) and a mobile station device is referred to as a User Equipment (UE). LTE is a cellular communication system in which a plurality of areas covered by base station devices are arranged in a cell form. A single base station device may manage a plurality of cells.

LTE corresponds to Time Division Duplex (TDD). LTE adopting a TDD scheme is referred to as TD-LTE or LTE TDD. TDD is a technology for enabling full duplex communication in a single frequency band by performing time division multiplexing on an uplink signal and a downlink signal.

In 3GPP, a traffic adaptation technology and an interference reduction technology (DL-UL Interference Management and Traffic Adaptation) for changing a ratio of an uplink resource to a downlink resource according to uplink traffic and downlink traffic have been examined.

NPL 1 proposes a method of using a flexible subframe as a method of realizing traffic adaptation. A base station device can transmit a downlink signal or can receive an uplink signal with a flexible subframe. In NPL 1, A mobile station device regards a flexible subframe as a downlink subframe unless the mobile station device is instructed to transmit an uplink signal by the base station device. Here, the traffic adaptation technology is also referred to as dynamic TDD.

NPL 1 describes that a Hybrid Automatic Repeat reQuest (HARQ) timing corresponding to a Physical Downlink Shared CHannel (PDSCH) is decided based on a newly introduced uplink-downlink configuration (UL-DL configuration) and an HARQ timing corresponding to a Physical Uplink Shared CHannel (PUSCH) is decided based on a first uplink-downlink configuration.

NPL 2 describes that (a) an UL-DL reference configuration is introduced and (b) several subframes can be scheduled for either uplink or downlink in accordance with dynamic grant/assignment from a scheduler.

In LTE release 10, a carrier aggregation technology for setting a plurality of cells for mobile station devices has been introduced.

CITATION LIST

Non-Patent Document

[Non-Patent Document 1] "On standardization impact of TDD UL-DL adaptation", R1-122016, Ericsson, ST-Ericsson, 3GPP TSG-RAN WG1 Meeting #69, Prague, Czech Republic, 21 to 25 May 2012

[Non-Patent Document 2] "Signalling support for dynamic TDD", R1-130558, Ericsson, ST-Ericsson, 3GPP TSG-RAN WG1 Meeting #72, St Julian's, Malta, 28 Jan. to 1 Feb. 2013

DISCLOSURE OF THE INVENTION

Problems to be Solved by the Invention

When a traffic adaptation technology is applied, throughput can be considerably improved further than when a ratio of an uplink resource to a downlink resource is not changed. However, in a radio communication system to which dynamic TDD is applied, a possibility of uplink and downlink signals colliding has not been sufficiently examined.

The present invention has been devised in light of the foregoing circumstances and an object of the present invention is to provide an integrated circuit and a radio communication method capable of efficiently transmitting and receiving uplink and downlink signals in a radio communication system to which a dynamic TDD is applied.

Means for Solving the Problems (1) In order to achieve an object described above, the present invention has devised the following means. That is, according to an aspect of the present invention, there is provided a terminal device communicating with a base station device, including a setting unit that sets resources used to calculate a channel quality indicator; a reception unit that monitors a physical downlink control channel accompanied with information indicating an uplink-downlink configuration; and a measurement unit that performs interference measurement to calculate the channel quality indicator based on the resource excluding at least the resource in an uplink subframe which is based on the uplink-downlink configuration.

(2) The terminal device further includes a transmission unit that transmits the channel quality indicator via a physical uplink shared channel, in which the transmission unit adjusts transmission with the physical uplink shared channel to which a physical downlink control channel accompanied with an uplink grant corresponds in subframe n+k based on detection of the physical downlink control channel accompanied with the uplink grant in subframe n, in which the setting unit sets a second uplink-downlink configuration, and in which k is given based on the second uplink-downlink configuration.

(3) In the terminal device, when the effective uplink-downlink configuration is not set, the measurement unit performs the interference measurement to calculate the channel quality indicator based on the resource excluding at least the resource in an uplink subframe which is based on the second uplink-downlink configuration.

(4) In the terminal device, the UL-DL configuration is defined by a downlink subframe, an uplink subframe, and a subframe including the DwPTS in a frame.

(5) According to another aspect of the present invention, there is provided an integrated circuit mounted on a terminal device communicating with a base station device, the integrated circuit causing the terminal device to have: a function of setting resources used to calculate a channel quality indicator; a function of monitoring a physical downlink control channel accompanied with information indicating an uplink-downlink configuration; and a function of performing interference measurement to calculate the channel quality indicator based on the resource excluding at least the resource in an uplink subframe which is based on the uplink-downlink configuration.

(6) The integrated circuit further causes the terminal device to have: a function of setting a second uplink-downlink configuration; a function of adjusting transmission with the physical uplink shared channel to which a physical downlink control channel accompanied with an uplink grant corresponds in subframe n+k based on detection of the physical downlink control channel accompanied with the uplink grant in subframe n; and a function of transmitting the channel quality indicator via the physical uplink shared channel, in which k is given based on the second uplink-downlink configuration.

(7) The integrated circuit further causes the terminal device to have a function of performing the interference measurement to calculate channel quality indicator based on the resource excluding at least the resource in an uplink subframe which is based on the second uplink-downlink configuration when the effective uplink-downlink configuration is not set.

(8) In the integrated circuit, the UL-DL configuration is defined by a downlink subframe, an uplink subframe, and a subframe including the DwPTS in a frame.

(9) According to still another aspect of the present invention, there is provided a radio communication method used in a terminal device communicating with a base station device, the radio communication method including: setting resources used to calculate a channel quality indicator; monitoring a physical downlink control channel accompanied with information indicating an uplink-downlink configuration; and performing interference measurement to calculate the channel quality indicator based on the resource excluding at least the resource in an uplink subframe which is based on the uplink-downlink configuration.

(10) The radio communication method further includes: setting a second uplink-downlink configuration; adjusting transmission with the physical uplink shared channel to which a physical downlink control channel accompanied with an uplink grant corresponds in subframe n+k based on detection of the physical downlink control channel accompanied with the uplink grant in subframe n; and transmitting the channel quality indicator via the physical uplink shared channel, in which k is given based on the second uplink-downlink configuration.

(11) The radio communication method further includes: performing the interference measurement to calculate channel quality indicator based on the resource excluding at least the resource in an uplink subframe which is based on the second uplink-downlink configuration when the effective uplink-downlink configuration is not set.

(12) In the radio communication method, the UL-DL configuration and the second UL-DL configuration are defined by a downlink subframe, an uplink subframe, and a subframe including the DwPTS in a frame.

Effects of the Invention

According to the present invention, in a radio communication system to which dynamic TDD is applied, it is possible to efficiently transmit and receive uplink and downlink signals.

BRIEF DESCRIPTION OF THE DRAWINGS

FIG. 9 is a table illustrating an example of an uplink-downlink configuration according to the embodiment.

FIG. 12 is a diagram illustrating a pair formed by the first uplink reference UL-DL configuration in the other serving cell (primary cell) and the first uplink reference UL-DL configuration in a serving cell (secondary cell) and correspondence of a second uplink reference UL-DL configuration in the secondary cell according to the embodiment.

FIG. 14 is a diagram illustrating a pair formed by the first downlink reference UL-DL configuration in a primary cell and the first downlink reference UL-DL configuration in a secondary cell and correspondence of a second downlink reference UL-DL configuration in the secondary cell according to the embodiment.

FIG. 15 is a diagram illustrating a relation between a subframe instructed in accordance with the first uplink reference UL-DL configuration and a subframe instructed in accordance with the first downlink reference UL-DL configuration according to the embodiment.

FIG. 16 is a diagram illustrating a relation among a subframe instructed in accordance with the first uplink reference UL-DL configuration, a subframe instructed in accordance with the first downlink reference UL-DL configuration, and a subframe instructed in accordance with a transmission direction UL-DL configuration according to the embodiment.

FIG. 17 is a diagram illustrating a relation among the first uplink reference UL-DL configuration, the first downlink reference UL-DL configuration, and the transmission direction UL-DL configuration according to the embodiment.

FIG. 18 is a diagram illustrating correspondence between subframe n in which PDCCH/EPDCCH/PHICH is disposed and subframe n+k in which a PUSCH corresponding to PDCCH/EPDCCH/PHICH is disposed according to the embodiment.

FIG. 19 is a diagram illustrating correspondence between subframe n in which a PHICH is disposed and subframe n−k in which a PUSCH corresponding to the PHICH is disposed according to the embodiment.

FIG. 20 is a diagram illustrating correspondence between subframe n in which a PUSCH is disposed and subframe n+k in which a PHICH corresponding to the PUSCH is disposed according to the embodiment. A mobile station device 1 specifies (selects or decides) a value of k in accordance with the table of FIG. 20.

FIG. 21 is a diagram illustrating correspondence between subframe n−k in which a PDSCH is disposed and subframe n in which an HARQ-ACK corresponding to the PDSCH is transmitted according to the embodiment.

FIG. 22 is a diagram illustrating an example of collision of an uplink signal/channel and a downlink signal/channel.

MODE FOR CARRYING OUT THE INVENTION

Hereinafter, embodiments of the present invention will be described.

In an embodiment, a plurality of cells are set for a mobile station device. A technology in which a mobile station device performs communication via a plurality of cells is referred to as cell aggregation or carrier aggregation. The present invention may be applied to each of the plurality of cells set for the mobile station device. The present invention may also be applied to some of the plurality of set cells. A cell set in a mobile station device is referred to as a serving cell.

A plurality of set serving cells include one primary cell and one secondary cell or a plurality of secondary cells. The primary cell is a serving cell in which an initial connection establishment procedure is performed, a serving cell in which connection re-establishment procedure starts, or a cell instructed as a primary cell in a handover procedure. The secondary cell may be set when or after RRC connection is established.

A Time Division Duplex (TDD) scheme is applied to a radio communication system according to the embodiment. In the case of cell aggregation, the TDD scheme may be applied to some or all of the plurality of cells.

When the plurality of cells to which the TDD is applied are aggregated, a half-duplex TDD scheme or a full-duplex TDD scheme is applied.

A mobile station device in the half-duplex TDD scheme cannot simultaneously perform uplink transmission and downlink reception in a plurality of cells to which the TDD is applied. In the case of the half-duplex TDD, a mobile station device does not simultaneously perform transmission and reception in one primary cell of a certain band, or one primary cell and one secondary cell or a plurality of secondary cells of a plurality of different bands.

A mobile station device in the full-duplex TDD scheme can simultaneously perform uplink transmission and downlink reception in a plurality of cells to which the TDD is applied. In the case of the full-duplex TDD, a mobile station device can simultaneously perform transmission and reception in a plurality of serving cells of a plurality of different bands.

A mobile station device transmits information indicating a combination of bands in which carrier aggregation is supported by the mobile station device to a base station device. The mobile station device transmits information indicating whether simultaneous transmission and reception is supported in the plurality of serving cells in the plurality of different bands to the base station device in each combination of the bands.

When a cell to which the TDD is applied and a cell to which a Frequency Division Duplex (FDD) is applied are aggregated, the present invention can be applied to the cell to which the TDD is applied.

In the embodiment, "X/Y" includes a meaning of "X or Y". In the embodiment, "X/Y" includes a meaning of "X and Y". In the embodiment, "X/Y" includes a meaning of "X and/or Y".

Figure 1:
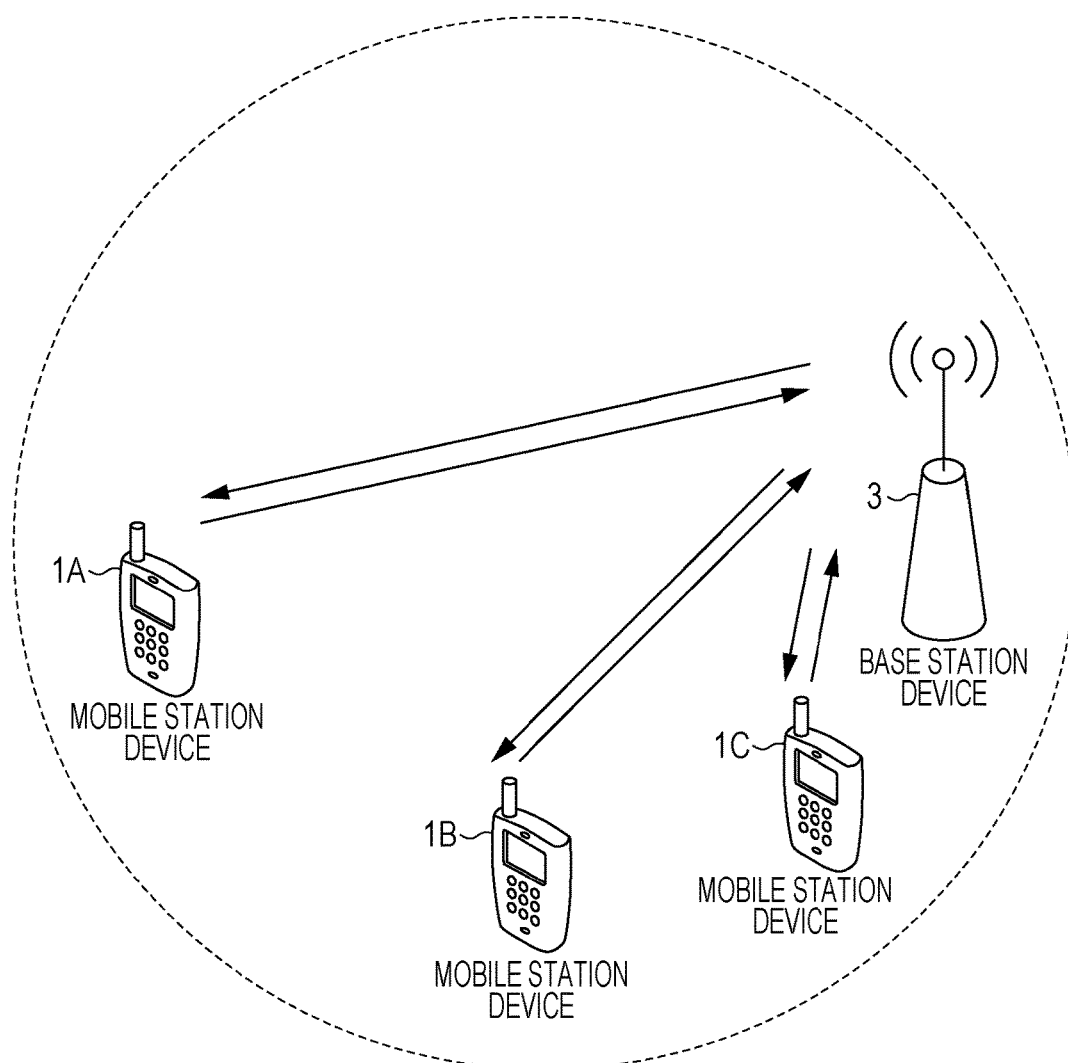
FIG. 1 is a conceptual diagram illustrating a radio communication system according to an embodiment.

FIG. 1 is a conceptual diagram illustrating a radio communication system according to the embodiment. In FIG. 1, the radio communication system includes mobile station devices 1A to 1C and a base station device 3. Hereinafter, the mobile station devices 1A to 1C are referred to as the mobile station devices 1.

Physical channels and physical signals according to the embodiment will be described.

In FIG. 1, the following uplink physical channels are used for uplink radio communication from the mobile station device 1 to the base station device 3. The uplink physical channels are used to transmit information output from a higher layer.

Physical Uplink Control CHannel (PUCCH)
Physical Uplink Shared CHannel (PUSCH)
Physical Random Access CHannel (PRACH)

The PUCCH is a physical channel used to transmit Uplink Control Information (UCI). The uplink control information includes Channel State Information (CSI) regarding downlink, a Scheduling Request (SR) indicating a request for PUSCH resources, and an ACKnowledgement (ACK)/Negative-ACKnowledgement (NACK) (ACK/NACK) for downlink data (a transport block or a Downlink-Shared CHannel (DL-SCH)). The ACK/NACK is also referred to as HARQ-ACK, an HARQ feedback, or response information.

The PUSCH is a physical channel that is used to transmit uplink data (an uplink-Shared CHannel (UL-SCH)). The PUSCH may be used to transmit the HARQ-ACK and/or the channel state information along with the uplink data. The PUSCH may be used to transmit only the channel state information or only the HARQ-ACK and the channel state information.

The PRACH is a physical channel that is used to transmit a random access preamble. The PRACH is mainly used for the mobile station device 1 to synchronize a time domain with the base station device 3. The PRACH is also used for an initial connection establishment procedure, a handover procedure, a connection re-establishment procedure, synchronization (timing adjustment) of uplink transmission, and a request for PUSCH resources.

In FIG. 1, the following uplink physical signal is used for uplink radio communication. The uplink physical signal is not used to transmit information output form a higher layer, but is used for a physical layer.

Uplink Reference Signal (UL RS)

In the embodiment, the following two types of uplink reference signals are used.

DeModulation Reference Signal (DMRS)
Sounding Reference Signal (SRS)

The DMRS is related to transmission of the PUSCH or the PUCCH. The DMRS is subjected to time multiplexing along with the PUSCH or the PUCCH. For example, the base station device 3 uses the DMRS to correct a propagation path of the PUSCH or the PUCCH. Hereinafter, transmission of both the PUSCH and the DMRS is simply referred to as transmission of the PUSCH. Hereinafter, transmission of both the PUCCH and the DMRS is simply referred to as transmission of the PUCCH.

The SRS is not related to transmission of the PUSCH or the PUCCH. For example, the base station device 3 uses the SRS to measure an uplink channel state. The mobile station device 1 transmits a first SRS with a first resource set by a higher layer. The mobile station device 1 transmits a second SRS with a second resource set by a higher layer only once when information indicating a request for transmitting the SRS is received via the PDCCH. The first SRS is also referred to as a periodic SRS. The second SRS is also referred to as an aperiodic SRS.

In FIG. 1, the following downlink physical channels are used for downlink radio communication from the base station device 3 to the mobile station device 1. The downlink physical channels are used to transmit information output from a higher layer.

Physical Broadcast CHannel (PBCH)
Physical Control Format Indicator CHannel (PCFICH)
Physical Hybrid automatic repeat request Indicator CHannel (PHICH)
Physical Downlink Control CHannel (PDCCH)
Enhanced Physical Downlink Control CHannel (EPDCCH)
Physical Downlink Shared CHannel (PDSCH)
Physical Multicast CHannel (PMCH)

The PBCH is used to report a Master Information Block (MIB or a Broadcast CHannel (BCH)) used commonly with the mobile station device 1. The MIB is transmitted at intervals of 40 ms and the MIB is transmitted repeatedly at a periodicity of 10 ms. Specifically, the MIB is initially transmitted with subframe 0 of a radio frame in which "SFN mod 4=0" is satisfied, and the MIB is retransmitted (repeated) with subframe 0 of all the other radio frames. A System Frame Number (SFN) is a radio frame number. The MIB is system information. For example, the MIB includes information indicating the SFN.

The PCFICH is used to transmit information for giving an instruction for a region (for example, OFDM symbols) used to transmit the PDCCH.

The PHICH is used to transmit an HARQ indicator (an HARQ feedback or response information) indicating an ACK (ACKnowledgement) or a NACK (Negative ACKnowledgement) for uplink data (Uplink Shared Channel (UL-SCH)) received by the base station device 3. For example, when the mobile station device 1 receives the HARQ indicator indicating the ACK, mobile station device 1 does not retransmit corresponding uplink data. For example, when the mobile station device 1 receives the HARQ indicator indicating the NACK, the mobile station device 1 retransmits corresponding uplink data. The single PHICH transmits the HARQ indicator for single uplink data. The base station device 3 transmits each of the HARQ indicators for a plurality of pieces of uplink data included in the same PUSCH using a plurality of PHICHs.

The PDCCH and the EPDCCH are used to transmit Downlink Control Information (DCI). The downlink control information is also referred to as the DCI format. The downlink control information includes a downlink grant and an uplink grant. The downlink grant is also referred to as a downlink assignment or a downlink allocation.

The downlink grant is used to schedule a single PDSCH in a single cell. The downlink grant is used to schedule the PDSCH in the same subframe as a subframe with which the downlink grant is transmitted. The uplink grant is used to schedule a single PUSCH in a single cell. The uplink grant is used to schedule a single PUSCH in a subframe after 4 subframes from a subframe with which the uplink grant is transmitted.

A Cyclic Redundancy Check (CRC) parity bit is added to the DCI format. The CRC parity bit is scrambled with a Cell-Radio Network Temporary Identifier (C-RNTI) or a Semi Persistent Scheduling Cell-Radio Network Temporary Identifier (SPS C-RNTI). The C-RNTI and the SPS C-RNTI are identifiers identifying a mobile station device in a cell.

The C-RNTI is used to control the PDSCH or the PUSCH in a single subframe. The SPS C-RNTI is used to periodically allocate resources of the PDSCH or the PUSCH.

The PDSCH is used to transmit downlink data (Downlink Shared CHannel (DL-SCH)).

The PMCH is used to transmit multicast data (Multicast CHannel (MCH)).

In FIG. 1, the following physical signals are used for downlink radio communication. The downlink physical signals are not used to transmit information output from a higher layer, but are used by a physical layer.

Synchronization Signal (SS)
Downlink Reference Signal (DL RS)

The synchronization signals are used for the mobile station device 1 to synchronize a frequency domain and a time domain of downlink. In the TDD scheme, synchronization signals are disposed in subframes 0, 1, 5, and 6 in a radio frame. In the FDD scheme, synchronization signals are disposed in subframes 0 and 5 in a radio frame.

The downlink reference signals are used for the mobile station device 1 to correct a propagation path of a downlink physical channel. The downlink reference signals are used for the mobile station device 1 to calculate downlink channel state information.

In the embodiment, the following 5 types of downlink reference signals are used.

Cell-specific Reference Signal (CRS)
UE-specific Reference Signal (URS) related to the PDSCH
DeModulation Reference Signal (DMRS) related to the EPDCCH
Non-Zero Power Channel State Information-Reference Signal (NZP CSI-RS)
Zero Power Channel State Information Reference Signal (ZP CSI-RS)
Multimedia Broadcast and Multicast Service over Single Frequency Network Reference Signal (MBSFN RS)
Positioning Reference Signal (PRS)

The CRS is transmitted with all of the subframes. The CRS is used to demodulate the PBCH/PDCCH/PHICH/PCFICH/PDSCH. The CRS may be used for the mobile station device 1 to calculate downlink channel state information. The PBCH/PDCCH/PHICH/PCFICH is transmitted with an antenna port used to transmit the CRS.

The URS related to the PDSCH is transmitted with a subframe and a band used to transmit the PDSCH to which the URS is related. The URS is used to demodulate the PDSCH to which the URS is related.

The PDSCH is transmitted with an antenna port used to transmit the CRS or the URS. DCI format 1A is used to schedule the PDSCH transmitted with the antenna port used to transmit the CRS. DCI format 2D is used to schedule the PDSCH transmitted with the antenna port used to transmit the URS.

The DMRS related to the EPDCCH is transported with a subframe and a band used to transmit the EPDCCH to which the DMRS is related. The DMRS is used to demodulate the EPDCCH to which the DMRS is related. The EPDCCH is transmitted with an antenna port used to transmit the DMRS.

The NZP CSI-RS is transmitted with a set subframe. Resources with which the NZP CSI-RS is transmitted are set by the base station device. The NZP CSI-RS is used for the mobile station device 1 to calculate downlink channel state information.

The resources of the ZP CSI-RS are set by the base station device. The base station device transmits the ZP CSI-RS by using a zero output. That is, the base station device does not transmit the ZP CSI-RS. The base station device does not transmit the PDSCH and the EPDCCH in the set resources of the ZP CSI-RS. For example, the mobile station device 1 can measure interference in resources to which the NZP CSI-RS corresponds in a certain cell.

The MBSFN RS is transmitted with all of the bands of the subframes used to transmit the PMCH. The MBSFN RS is used to demodulate the PMCH. The PMCH is transmitted with an antenna port used to transmit the MBSFN RS.

The PRS is used for the mobile station device to measure a geographic position of the own device.

Here, the downlink physical channels and the downlink physical signals are also collectively referred to as downlink signals. The uplink physical channels and the uplink physical signals are also collectively referred to as uplink signals. The downlink physical channels and the uplink physical channels are also collectively referred to as physical channels. The downlink physical signals and the uplink physical signals are also collectively referred to as physical signals.

The BCH, the MCH, the UL-SCH, and the DL-SCH are transport channels. Channels used in a Medium Access Control (MAC) layer are referred to as transport channels. Units of the transport channels used in the MAC layer are referred to as Transport Blocks (TB) or MAC Protocol Data Units (PDUs). For example, control of a Hybrid Automatic Repeat reQuest (HARQ) is performed for each transport block in the MAC layer. The transport blocks are units of data delivered from the MAC layer to the physical layer. In the physical layer, the transport block is mapped to a codeword and a coding process is performed for each codeword.

Hereinafter, the structure of a radio frame according to the embodiment will be described.

Figure 2:
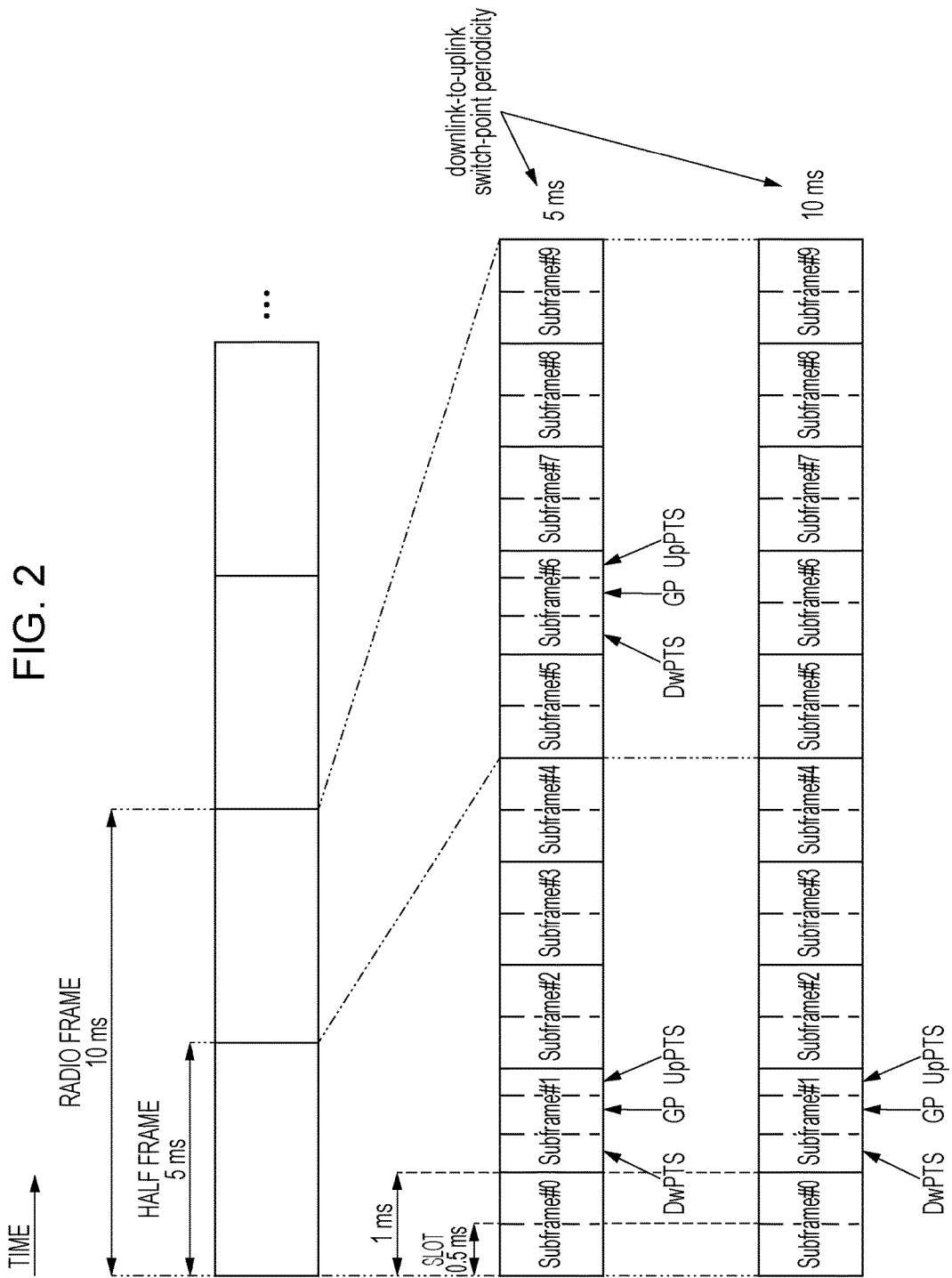
FIG. 2 is a diagram illustrating a schematic structure of a radio frame according to the embodiment.

FIG. 2 is a diagram illustrating a schematic structure of a radio frame according to the embodiment. For example, each radio frame has a length of 10 ms. In FIG. 2, the horizontal axis is a time axis. Each radio frame is configured to include two half frames. Each half frame has a length of 5 ms. Each half frame is configured to include 5 subframes. Each subframe has a length of 1 ms and is defined by 2 continuous slots. Each slot has a length of 0.5 ms. An i-th subframe in the radio frame is configured to include a (2×i)-th slot and a (2×i+1)-th slot. That is, 10 subframes are used at intervals of 10 ms.

In the embodiment, the following three types of subframes are defined.
downlink subframe (first subframe)
uplink subframe (second subframe)
special subframe (third subframe)

The downlink subframe is a subframe that is reserved for downlink transmission. The uplink subframe is a subframe that is reserved for uplink transmission. The special subframe is configured to three fields. The three fields are a Downlink Pilot Time Slot (DwPTS), a Guard Period (GP), and an Uplink Pilot Time Slot (UpPTS). The total length of the DwPTS, the GP, and the UpPTS is 1 ms. The DwPTS is a field that is reserved for downlink transmission. The UpPTS is a field that is reserved for uplink transmission. The GP is a field that is not used for downlink transmission and uplink transmission. The special subframe may be configured to include only the DwPTS and the GP or may be configured to include only the GP and the UpPTS.

The single radio frame is configured to include at least the downlink subframe, the uplink subframe, and the special subframe.

In the radio communication system according to the embodiment, downlink-uplink switch-point periodicities of 5 ms and 10 ms are supported. When the downlink-uplink switch-point periodicity is 5 ms, the special subframe is included in both of the half frames in the radio frame. When the downlink-uplink switch-point periodicity is 10 ms, the special subframe is included only in the first half frame in the radio frame.

Hereinafter, the structure of a slot according to the embodiment will be described.

Figure 3:
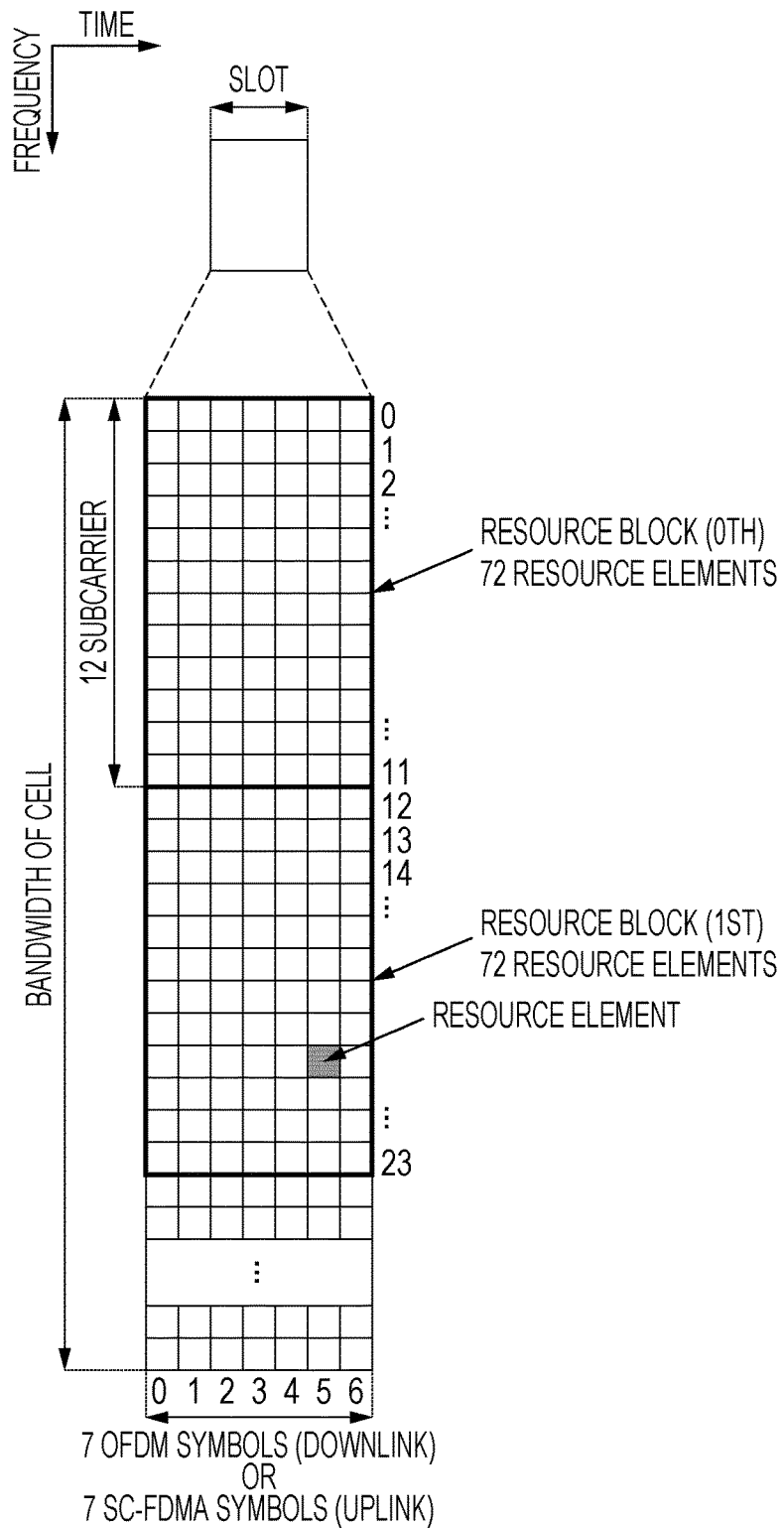
FIG. 3 is a diagram illustrating an example of the structure of a slot according to the embodiment.

FIG. 3 is a diagram illustrating the structure of the slot according to the embodiment. The physical signals or the physical channels transmitted with each slot are expressed by a resource grid. In FIG. 3, the horizontal axis is a time axis and the vertical axis is a frequency axis. In downlink, the resource grid is defined in accordance with a plurality of subcarriers and a plurality of OFDM symbols. In uplink, the resource grid is defined in accordance with a plurality of subcarriers and a plurality of SC-FDMA symbols. The number of subcarriers included in one slot depends on the bandwidth of a cell. The number of OFDM symbols or SC-FDMA symbols included in one slot is 7. Each of the elements in the resource grid is referred to as a resource element. The resource element is identified using a subcarrier number and an OFDM symbol or SC-FDMA symbol number.

The resource block is used to express mapping of a certain physical channel (the PDSCH, the PUSCH, or the like) to the resource element. In a resource block, a virtual resource block and a physical resource block are defined. A certain physical channel is first mapped to a virtual resource block. Thereafter, the virtual resource block is mapped to a physical resource block. One physical resource block is defined in accordance with 7 continuous OFDM symbols or SC-FDMA symbols in the time domain and 12 continuous subcarriers in the frequency domain. That is, one physical resource block is configured to include (7×12) resource elements. One physical resource block corresponds to one slot in the time domain and corresponds to 180 kHz in the frequency domain. Numbers from 0 are attached to the physical resource blocks in the frequency domain.

Hereinafter, the physical channels and the physical signals transmitted in each subframe will be described.

Figure 4:
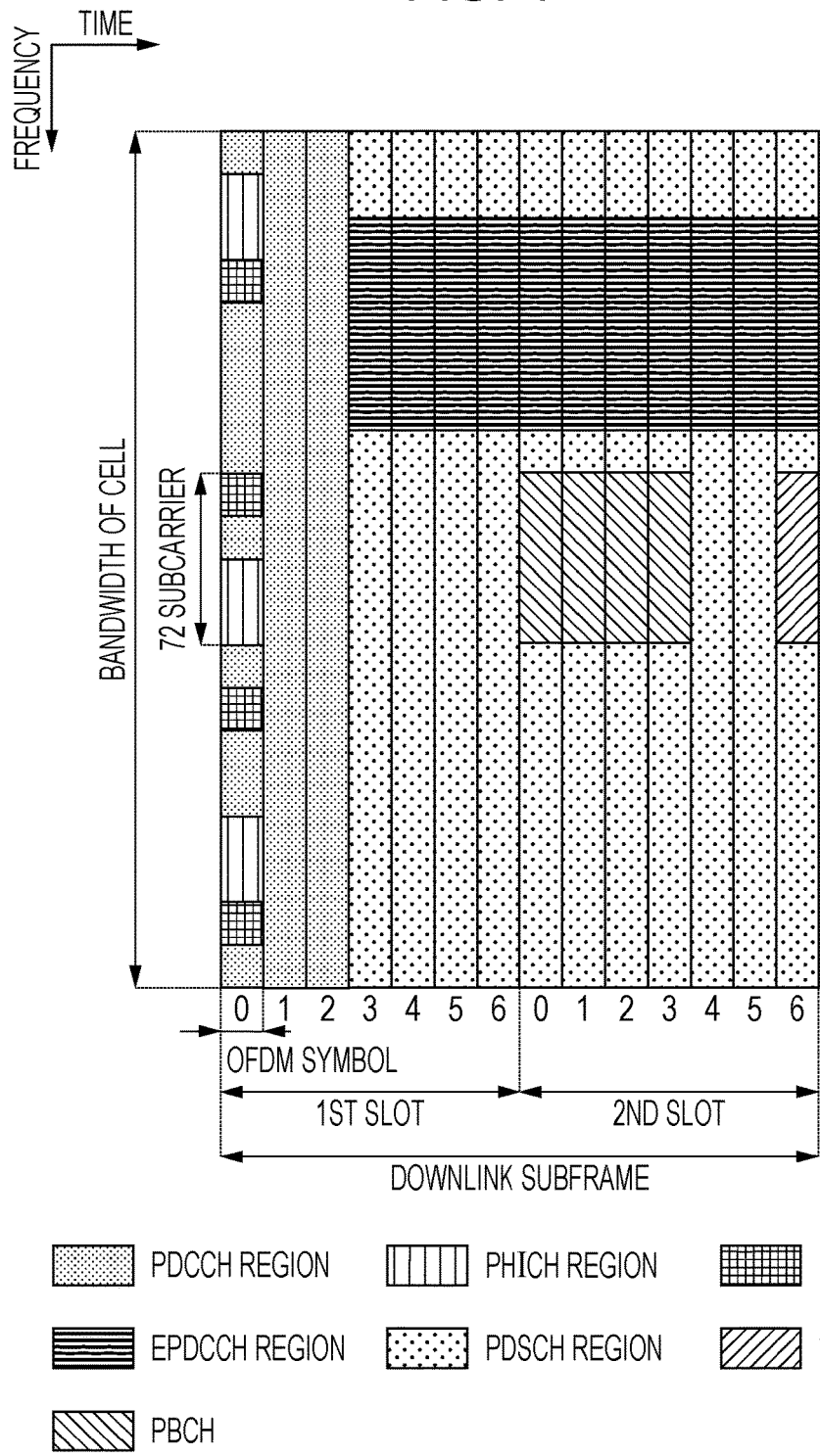
FIG. 4 is a diagram illustrating an arrangement example of physical channels and physical signals in a downlink subframe according to the embodiment.

FIG. 4 is a diagram illustrating an arrangement example of physical channels and physical signals in a downlink subframe according to the embodiment. In FIG. 4, the horizontal axis is a time axis and the vertical axis is a frequency axis. The base station device 3 may transmit the downlink physical channels (the PBCH, the PCFICH, the PHICH, the PDCCH, the EPDCCH, and the PDSCH) and the downlink physical signals (synchronization signals and downlink reference signals) in a downlink subframe. The PBCH is transmitted only with subframe 0 in the radio frame. The downlink reference signals are arranged in the resource elements distributed in the frequency domain and the time domain. To facilitate the description, the downlink reference signals are not illustrated in FIG. 4.

In the PDCCH region, the plurality of PDCCHs may be subjected to frequency and time multiplexing. In the EPDCCH region, the plurality of EPDCCHs may be subjected to frequency, time, and spatial multiplexing. In the PDSCH region, the plurality of PDSCHs may be subjected to frequency and spatial multiplexing. The PDCCH and the PDSCH or the EPDCCH may be subjected to time multiplexing. The PDSCH and the EPDCCH may be frequency multiplexing.

Figure 5:
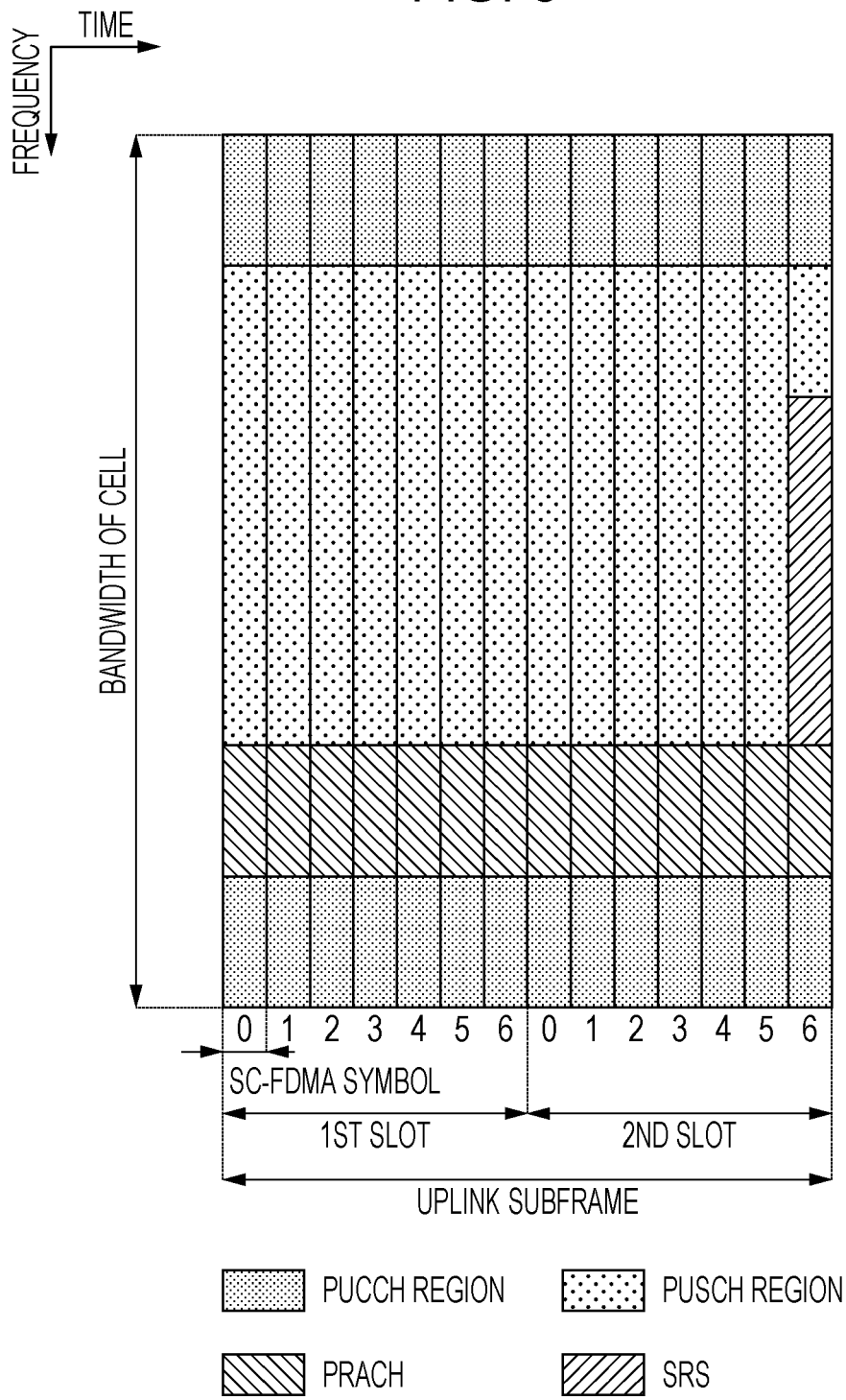
FIG. 5 is a diagram illustrating an arrangement example of physical channels and physical signals in an uplink subframe according to the embodiment.

FIG. 5 is a diagram illustrating an arrangement example of physical channels and physical signals in an uplink subframe according to the embodiment. In FIG. 5, the horizontal axis is a time axis and the vertical axis is a frequency axis. The mobile station device 1 may transmit the uplink physical channels (the PUCCH, the PUSCH, and the PRACH) and uplink physical signals (the DMRS and the SRS) in an uplink subframe. For example, in the PUCCH region, the plurality of PUCCHs are subjected to frequency, time, and code multiplexing. In the PUSCH region, the plurality of PUSCH may be subjected to the frequency and spatial multiplexing. The PUCCH and the PUSCH may be subjected to the frequency multiplexing. The PRACH may be disposed at a single subframe or two subframes. The plurality of PRACHs may be subjected to code multiplexing.

The SRS is transmitted using the final SC-FDMA symbol of the uplink subframe. That is, the SRS is disposed at the final SC-FDMA symbol in the uplink subframe. The mobile station device 1 cannot simultaneously transmit the SRS and the PUCCH/PUSCH/PRACH using the single SC-FDMA symbol in a single cell. The mobile station device 1 can transmit the PUSCH and/or the PUCCH using the SC-FDMA symbols excluding the final SC-FDMA symbol in the uplink subframe of the single cell and can transmit the SRS using the final SC-FDMA symbol in the uplink subframe with the uplink subframe. That is, the mobile station device 1 can transmit both of the SRS and the PUSCH/PUCCH in the single uplink subframe of the single cell. The DMRS is subjected to the time multiplexing along with the PUCCH or the PUSCH. Here, to facilitate the description, the DMRS is not illustrated in FIG. 5.

Figure 6:
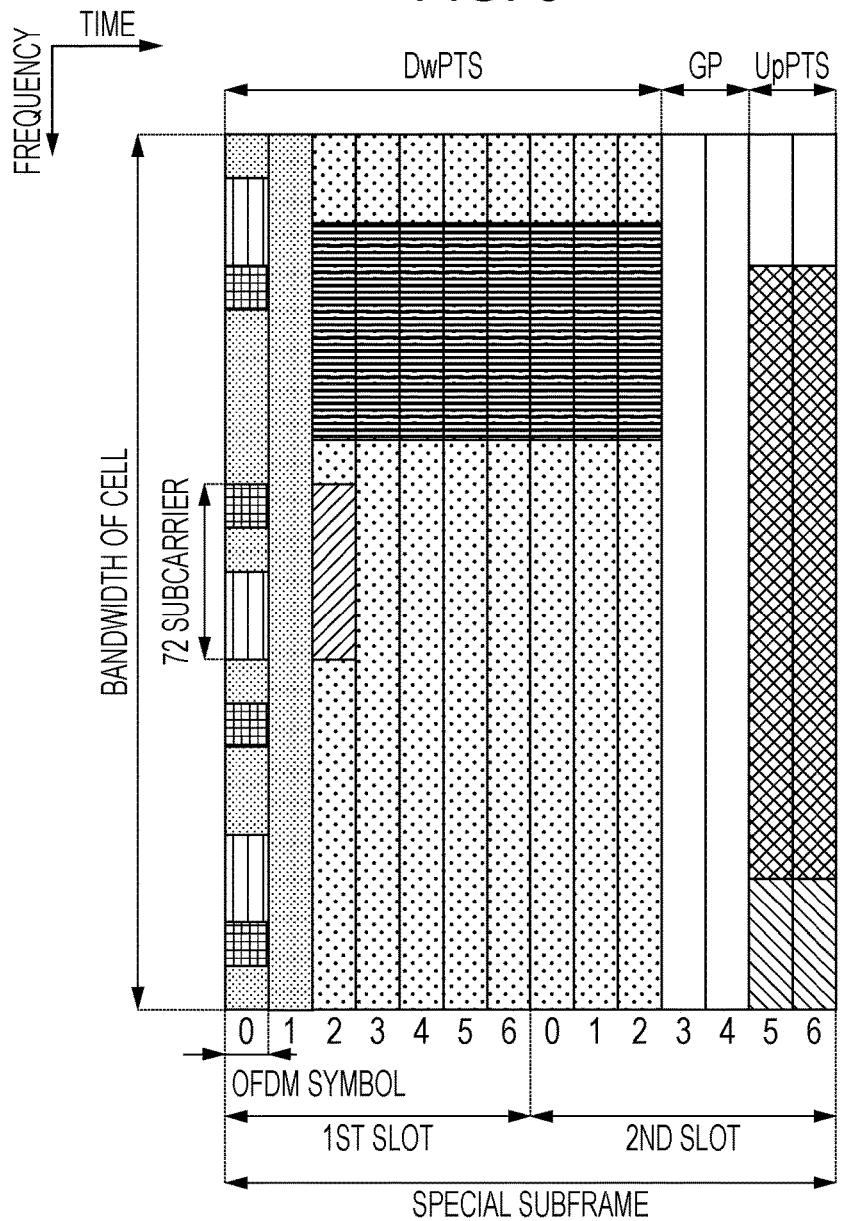
FIG. 6 is a diagram illustrating an arrangement example of physical channels and physical signals in a special subframe according to the embodiment.

FIG. 6 is a diagram illustrating an arrangement example of physical channels and physical signals in a special subframe according to the embodiment. In FIG. 6, the horizontal axis is a time axis and the vertical axis is a frequency axis. In FIG. 6, the DwPTS is configured to include the 1st to 9th SC-FDMA symbols in the special subframe. The GP is configured to include the 10th to 12th SC-FDMA symbols in the special subframe. The UpPTS is configured to include the 13th to 14th SC-FDMA symbols in the special subframe.

The base station device 3 may transmit the PCFICH, the PHICH, the PDCCH, the EPDCCH, the PDSCH, a synchronization signal, and a downlink reference signal in the DwPTS of the special subframe. The base station device 3 does not transmit the PBCH in the DwPTS of the special subframe. The mobile station device 1 may transmit the PRACH and the SRS in the UpPTS of the special subframe. That this, the terminal device 1 does not transmit the PUCCH, the PUSCH, and the DMRS in the UpPTS of the special subframe.

Figure 7:
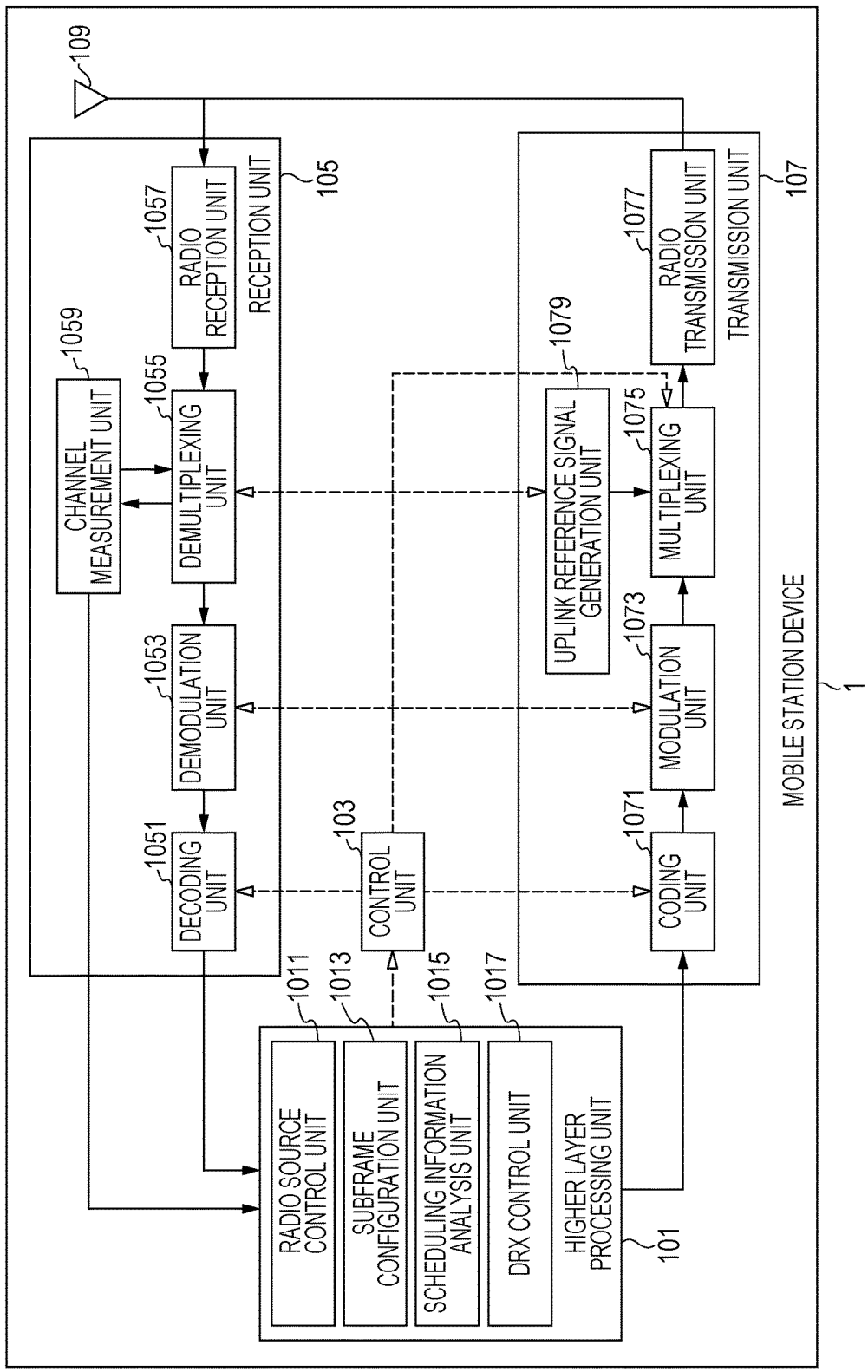
FIG. 7 is a schematic block diagram illustrating the structure of a mobile station device 1 according to the embodiment.

FIG. 7 is a schematic block diagram illustrating the structure of the mobile station device 1 according to the embodiment. As illustrated, the mobile station device 1 is configured to include a higher layer processing unit 101, a control unit 103, a reception unit 105, a transmission unit 107, and a transmission and reception antenna 109. The higher layer processing unit 101 is configured to include a radio resource control unit 1011, a subframe configuration unit 1013, a scheduling information analysis unit 1015, and a Discontinuous Reception (DRX) control unit 1017. The reception unit 105 is configured to include a decoding unit 1051, a demodulation unit 1053, a demultiplexing unit 1055, a radio reception unit 1057, and a channel measurement unit 1059. The transmission unit 107 is configured to include a coding unit 1071, a modulation unit 1073, a multiplexing unit 1075, a radio transmission unit 1077, and an uplink reference signal generation unit 1079.

The higher layer processing unit 101 outputs uplink data (transport block) generated through a user operation or the like to the transmission unit 107. The higher layer processing unit 101 performs processes for a Medium Access Control (MAC) layer, a Packet Data Convergence Protocol (PDCP) layer, a Radio Link Control (RLC) layer, and a Radio Resource Control (RRC) layer.

The radio resource control unit 1011 included in the higher layer processing unit 101 manages various kinds of setting information regarding the own device. The radio resource control unit 1011 generates information disposed in each uplink channel and outputs the information to the transmission unit 107.

The subframe configuration unit 1013 included in the higher layer processing unit 101 manages a first uplink reference UL-DL configuration, a first downlink reference UL-DL configuration, a second uplink reference UL-DL configuration, a second downlink reference UL-DL configuration, and a transmission direction UL-DL configuration.

The subframe configuration unit 1013 sets the first uplink reference UL-DL configuration, the first downlink reference UL-DL configuration, the second uplink reference UL-DL configuration, the second downlink reference UL-DL configuration, and the transmission direction UL-DL configuration.

The scheduling information analysis unit 1015 included in the higher layer processing unit 101 analyzes the DCI format (scheduling information) received via the reception unit 105, generates control information to control the reception unit 105 and the transmission unit 107 based on the result obtained by analyzing the DCI format, and outputs the control information to the control unit 103.

The scheduling information analysis unit 1015 decides timings of a transmission process and a reception process based on the first uplink reference UL-DL configuration, the first downlink reference UL-DL configuration, the second uplink reference UL-DL configuration, the second downlink reference UL-DL configuration, and/or the transmission direction UL-DL configuration.

The DRX control unit 1017 specifies (selects or decides) the first uplink reference UL-DL configuration, and/or the first downlink reference UL-DL configuration, and/or the second uplink reference UL-DL configuration, and/or the second downlink reference UL-DL configuration, and/or the transmission direction UL-DL configuration.

The DRX control unit 1017 performs a DRX process based on the PDCCH subframe. The DRX control unit 1017 manages a timer related to the DRX based on the PDCCH subframe.

The DRX control unit 1017 instructs the reception unit 105 to monitor the PDCCH/EPDCCH in a subframe.

The control unit 103 generates control signals for controlling the reception unit 105 and the transmission unit 107 based on the control information from the higher layer processing unit 101. The control unit 103 outputs the generated control signals to the reception unit 105 and the transmission unit 107 and controls the reception unit 105 and the transmission unit 107.

The reception unit 105 separates, demodulates, and decodes a received signal received from the base station device 3 via the transmission and reception antenna 109 in accordance with the control signals input from the control unit 103, and outputs the decoded information to the higher layer processing unit 101.

The radio reception unit 1057 converts (downconverts) a downlink signal received via the transmission and reception antenna 109 into an intermediate frequency, removes unnecessary frequency components, controls an amplification level so that a signal level is appropriately maintained, performs orthogonal demodulation based on an in-phase component and an orthogonal component of the received signal, and converts an analog signal subjected to the orthogonal demodulation into a digital signal. The radio reception unit 1057 removes a portion corresponding to a Guard Interval (GI) from the converted digital signal and performs Fast Fourier Transform (FFT) on the signal from which the guard interval is removed and extracts a signal of the frequency domain.

The demultiplexing unit 1055 demultiplexes the extracted signal into the PHICH, the PDCCH, the EPDCCH, the PDSCH, and the downlink reference signal. The demultiplexing unit 1055 compensates propagation paths of the PHICH, the PDCCH, the EPDCCH, and the PDSCH from estimated values of the propagation paths input from the channel measurement unit 1059. The demultiplexing unit 1055 outputs the demultiplexed downlink reference signal to the channel measurement unit 1059.

The demodulation unit 1053 multiples and combines codes corresponding to the PHICH, demodulates the combined signal in conformity to a Binary Phase Shift Keying (BPSK) modulation scheme, and outputs a demodulated signal to the decoding unit 1051. The decoding unit 1051 decodes the PHICH destined for the own device and outputs the decoded HARQ indicator to the higher layer processing unit 101. The demodulation unit 1053 demodulates the PDCCH and/or the EPDCCH in conformity to a QPSK modulation scheme and outputs the demodulated signal to the decoding unit 1051. The decoding unit 1051 attempts to decode the PDCCH and/or the EPDCCH. When the decoding succeeds, the decoded downlink control information and the RNTI corresponding to the downlink control information are output to the higher layer processing unit 101.

The demodulation unit 1053 demodulates the PDSCH in conformity to a demodulation scheme reported with the downlink grant, such as Quandrature Phase Shift Keying (QPSK), 16 Quandrature Amplitude Modulation (QAM), or 64 QAM, and outputs the demodulated results to the decoding unit 1051. The decoding unit 1051 performs decoding based on information regarding a coding ratio reported with the downlink control information and outputs the decoded downlink data (transport block) to the higher layer processing unit 101.

The channel measurement unit 1059 measures a downlink path loss or channel state from the downlink reference signal input from the demultiplexing unit 1055 and outputs the measured path loss or the channel state to the higher layer processing unit 101. The channel measurement unit 1059 calculates an estimated value of the downlink propagation path from the downlink reference signal and outputs the estimated value of the downlink propagation path to the demultiplexing unit 1055.

The transmission unit 107 generates an uplink reference signal according to the control signal input from the control unit 103, codes and modulates the uplink data (the transport block) input from the higher layer processing unit 101, multiplexes the PUCCH, the PUSCH, and the generated uplink reference signal, and transmits the multiplexed signal to the base station device 3 via the transmission and reception antenna 109.

The coding unit 1071 performs coding, such as convolution coding or block coding, on the uplink control information input from the higher layer processing unit 101. The coding unit 1071 performs turbo coding based on information used to schedule the PUSCH.

The modulation unit 1073 modulates coded bits input from the coding unit 1071 in conformity to a modulation scheme, such as BPSK, QPSK, 16 QAM, or 64 QAM, reported with the downlink control information or a modulation scheme decided in advance for each channel. The modulation unit 1073 decides the number of series of data subjected to spatial multiplexing based on the information used to schedule the PUSCH, maps a plurality of pieces of uplink data transmitted with the same PUSCH to the plurality of series by using Multiple Input Multiple Output Spatial Multiplexing (MIMO SM), and performs precoding on the series.

The uplink reference signal generation unit 1079 generates a series obtained by a pre-decided rule (expression) based on a Physical Cell Identity (PCI) (referred to as a cell ID or the like) for identifying the base station device 3, a bandwidth in which the uplink reference signal is disposed, cyclic shift reported with an uplink grant, a value of a parameter for generating a DMRS sequence, and the like. The multiplexing unit 1075 sorts the modulation symbols of the PUSCH in parallel according to the control signal input from the control unit 103, and then performs Discrete Fourier Transform (DFT). The multiplexing unit 1075 multiplexes the signals of the PUCCH and the PUSCH and the generated uplink reference signal for each transmission antenna port. That is, the multiplexing unit 1075 disposes the signals of the PUCCH and the PUSCH and the generated uplink reference signal in the resource elements for each transmission antenna port.

The radio transmission unit 1077 performs Inverse Fast Fourier Transform (IFFT) on the multiplexed signal, performs modulation of an SC-FDMA scheme, adds the guard interval to the SC-FDMA symbol subjected to the SC-FDMA modulation, generates a baseband digital signal, converts the baseband digital signal into an analog signal, generates an in-phase component and an orthogonal component of an intermediate frequency from the analog signal, removes excessive frequency component in regard to an intermediate frequency band, converts (upconverts) the signal of the intermediate frequency into a signal of a high frequency, removes an excessive frequency component, performs power amplification, and outputs the signal to the transmission and reception antenna 109 to transmit the signal.

Figure 8:
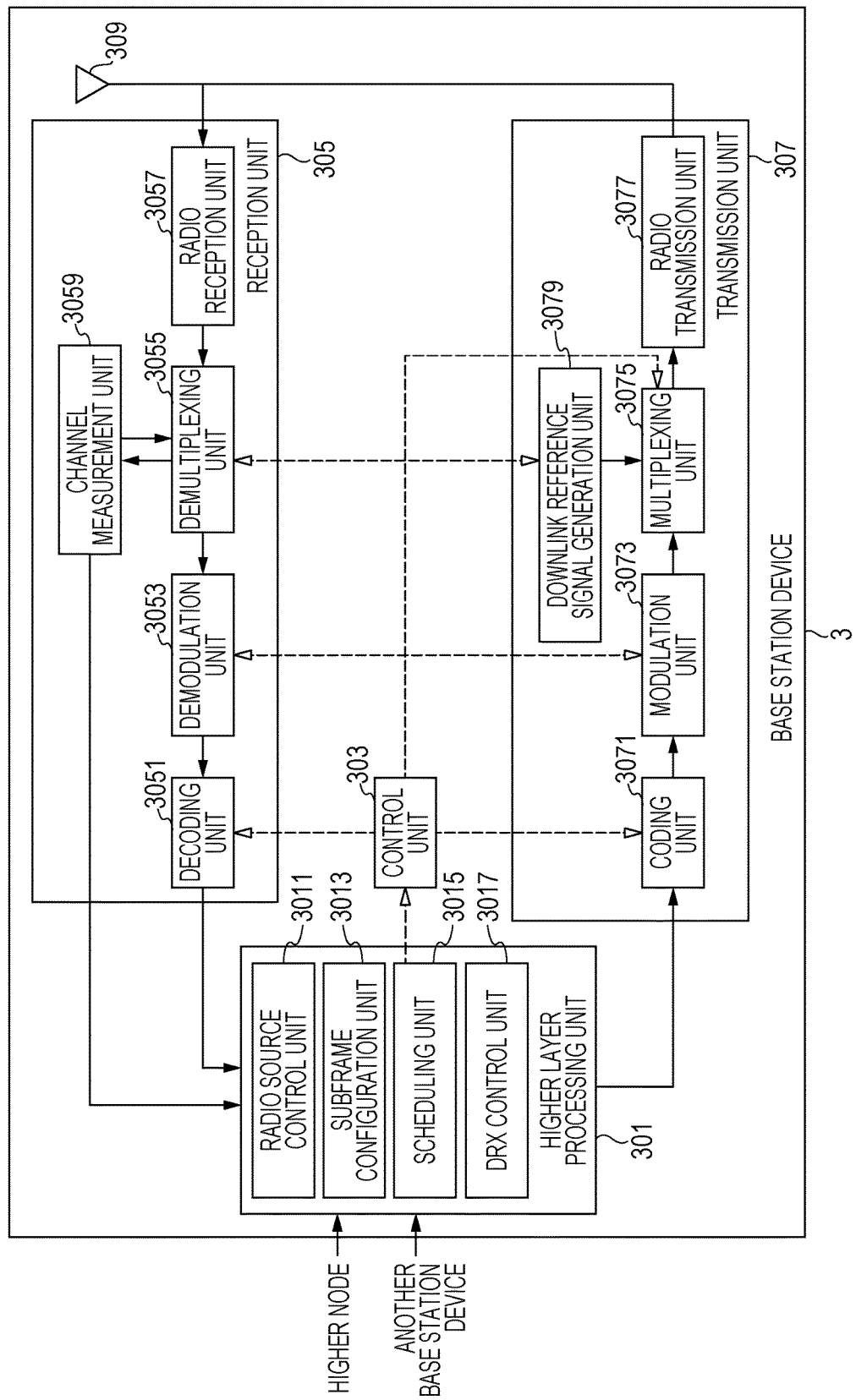
FIG. 8 is a schematic block diagram illustrating the structure of a base station device 3 according to the embodiment.

FIG. 8 is a schematic block diagram illustrating the structure of the base station device 3 according to the embodiment. As illustrated, the base station device 3 is configured to include a higher layer processing unit 301, a control unit 303, a reception unit 305, a transmission unit 307, and a transmission and reception antenna 309. The higher layer processing unit 301 is configured to include a radio resource control unit 3011, a subframe configuration unit 3013, a scheduling unit 3015, and a DRX control unit 3017. The reception unit 305 is configured to include a decoding unit 3051, a demodulation unit 3053, a demultiplexing unit 3055, a radio reception unit 3057, and a channel measurement unit 3059. The transmission unit 307 is configured to include a coding unit 3071, a modulation unit 3073, a multiplexing unit 3075, a radio transmission unit 3077, and a downlink reference signal generation unit 3079.

The higher layer processing unit 301 performs processes for a Medium Access Control (MAC) layer, a Packet Data Convergence Protocol (PDCP) layer, a Radio Link Control (RLC) layer, and a Radio Resource Control (RRC) layer. The higher layer processing unit 301 generates control information to control the reception unit 305 and the transmission unit 307 and outputs the control information to the control unit 303.

The radio resource control unit 3011 included in the higher layer processing unit 301 generates downlink data (transport block) disposed in the downlink PDSCH, system information, an RRC message, a MAC Control Element (CE), and the like or acquires the downlink data, the downlink PDSCH, the system information, the RRC message, the MAC CE, and the like or acquires them from a higher node, and outputs them to the transmission unit 307. The radio resource control unit 3011 manages various kinds of setting information regarding each mobile station device 1.

The subframe configuration unit 3013 included in the higher layer processing unit 301 manages the first uplink reference UL-DL configuration, the first downlink reference UL-DL configuration, the second uplink reference UL-DL configuration, the second downlink reference UL-DL configuration, and the transmission direction UL-DL configuration in each mobile station device 1.

The subframe configuration unit 3013 sets the first uplink reference UL-DL configuration, the first downlink reference UL-DL configuration, the second uplink reference UL-DL configuration, the second downlink reference UL-DL configuration, and the transmission direction UL-DL configuration in each mobile station device 1.

The subframe configuration unit 3013 generates first information indicating the first uplink reference UL-DL configuration, second information indicating the first downlink reference UL-DL configuration, and third information indicating the transmission direction UL-DL configuration. The subframe configuration unit 3013 transmits the first information, the second information, and the third information to the mobile station device 1 via the transmission unit 307.

The base station device 3 may decide the first uplink reference UL-DL configuration, the first downlink reference UL-DL configuration, the second uplink reference UL-DL configuration, the second downlink reference UL-DL configuration, and/or the transmission direction UL-DL configuration in the mobile station device 1. The base station device 3 may be instructed to perform the first uplink reference UL-DL configuration, the first downlink reference UL-DL configuration, the second uplink reference UL-DL configuration, the second downlink reference UL-DL configuration, and/or the transmission direction UL-DL configuration in the mobile station device 1 by a higher node.

For example, the subframe configuration unit 3013 may decide the first uplink reference UL-DL configuration, the first downlink reference UL-DL configuration, the second uplink reference UL-DL configuration, the second downlink reference UL-DL configuration, and/or the transmission direction UL-DL configuration based on an amount of uplink traffic and an amount of downlink traffic.

The scheduling unit 3015 included in the higher layer processing unit 301 decides a frequency and a subframe to which the physical channels (the PDSCH and the PUSCH) are allocated and a coding ratio, a modulation scheme, transmission power, and the like of the physical channels (the PDSCH and the PUSCH) based on the estimated value of the propagation path, channel quality, or the like input from the channel measurement unit 3059. The scheduling unit 3015 decides whether to schedule the downlink physical channel and/or the downlink physical signal or schedule the uplink physical channel and/or the uplink physical signal in a flexible subframe. The scheduling unit 3015 generates control information (for example, the DCI format) to control the reception unit 305 and the transmission unit 307 based on the scheduling result and outputs the control information to the control unit 303.

The scheduling unit 3015 generates information used to schedule the physical channels (the PDSCH and the PUSCH) based on the scheduling result. The scheduling unit 3015 decides timings at which a transmission process and a reception process are performed based on the first uplink reference UL-DL configuration, the first downlink reference UL-DL configuration, the second uplink reference UL-DL configuration, the second downlink reference UL-DL configuration, and/or the transmission direction UL-DL configuration.

The DRX control unit 3017 included in the higher layer processing unit 301 specifies (selects or decides) the PDCCH subframe based on the first uplink reference UL-DL configuration, and/or the first downlink reference UL-DL configuration, and/or the second uplink reference UL-DL configuration, and/or the second downlink reference UL-DL configuration, and/or the transmission direction UL-DL configuration.

The DRX control unit 3017 manages a timer related to the DRX based on the foregoing PDCCH subframe. The DRX control unit 3017 determines whether the mobile station device 1 monitors the PDCCH/EPDCCH in the subframe. The DRX control unit 3017 notifies the scheduling unit 3015 of the determined result.

The control unit 303 generates control signals to control the reception unit 305 and the transmission unit 307 based on the control information from the higher layer processing unit 301. The control unit 303 outputs the generated control signals to the reception unit 305 and the transmission unit 307 and controls the reception unit 305 and the transmission unit 307.

The reception unit 305 separates, demodulates, and decodes a received signal received from the mobile station device 1 via the transmission and reception antenna 309 in accordance with the control signals input from the control unit 303, and outputs the decoded information to the higher layer processing unit 301. The radio reception unit 3057 converts (downconverts) an uplink signal received via the transmission and reception antenna 309 into an intermediate frequency, removes unnecessary frequency components, controls an amplification level so that a signal level is appropriately maintained, performs orthogonal demodulation based on an in-phase component and an orthogonal component of the received signal, and converts an analog signal subjected to the orthogonal demodulation into a digital signal.

The radio reception unit 3057 removes a portion corresponding to a Guard Interval (GI) from the converted digital signal. The radio reception unit 3057 performs Fast Fourier Transform (FFT) on the signal from which the guard interval is removed, extracts a signal of the frequency domain, and outputs the signal to the demultiplexing unit 3055.

The demultiplexing unit 1055 demultiplexes the signal input from the radio reception unit 3057 into the PUCCH, the PUSCH, and the uplink reference signal. The signal is demultiplexed based on allocation information of radio resources decided in advance by the radio resource control unit 3011 of the base station device 3 and included in the uplink grant reported by each mobile station device 1. The demultiplexing unit 3055 compensates propagation paths of the PUCCH and the PUSCH from estimated values of the propagation paths input from the channel measurement unit 3059. The demultiplexing unit 3055 outputs the demultiplexed uplink reference signal to the channel measurement unit 3059.

The demodulation unit 3053 performs Inverse Discrete Fourier Transform (IDFT) on the PUSCH, acquires the modulation symbol, and demodulates the received signal using a modulation scheme, such as Binary Phase Shift Keying (BPSK), QPSK, 16 QAM, or 64 QAM, decided in advance for each modulation symbol of the PUCCH and the PUSCH or notified of each mobile station device 1 by the own device in advance with the uplink grant. The demodulation unit 3053 demultiplexes the modulation symbol of the plurality of pieces of uplink data transmitted with the same PUSCH by using the MIMO SM based on the number of series notified of each mobile station device 1 and subjected to the spatial multiplexing in advance with the uplink grant and information instructing precoding performed on the series.

The decoding unit 3051 decodes coded bits of the demodulated PUSCH and PUSCH at a coding ratio of a pre-decided coding scheme decided in advance or notified of the mobile station device 1 by the own device in advance with the uplink grant and outputs the decoded uplink data and the uplink control information to the higher layer processing unit 101. When the PUSCH is retransmitted, the decoding unit 3051 performs the decoding by using the coded bits input from the higher layer processing unit 301 and retained in an HARQ buffer and the demodulated coded bits. The channel measurement unit 309 measures an estimated value of the propagation path, equality of the channel, and the like from the uplink reference signal input from the demultiplexing unit 3055 and outputs the estimated value of the propagation path, the quality of the channel, and the like to the demultiplexing unit 3055 and the higher layer processing unit 301.

The transmission unit 307 generates a downlink reference signal according to the control signal input from the control unit 303, codes and modulates the HARQ indicator, the downlink control information, and the downlink data input from the higher layer processing unit 301, multiplexes the PHICH, the PDCCH, the EPDCCH, the PDSCH, and the downlink reference signal, and transmits the multiplexed signal to the mobile station device 1 via the transmission and reception antenna 309.

The coding unit 3071 performs coding, such as convolution coding or turbo coding, on the HARQ indicator, the downlink control information, and the downlink data input from the higher layer processing unit 301 by using a pre-decided coding scheme. Alternatively, the coding unit 3071 performs the coding by using a coding scheme decided by the radio resource control unit 3011. The modulation unit 3073 modulates coded bits input from the coding unit 3071 in conformity to a modulation scheme, such as BPSK, QPSK, 16 QAM, or 64 QAM, decided in advance or decided by the radio resource control unit 3011.

The downlink reference signal generation unit 3079 generates, as a downlink reference signal, a series known by the mobile station device 1 and obtained by a pre-decided rule based on a Physical Cell Identity (PCI) for identifying the base station device 3. The multiplexing unit 3075 multiplexes the modulated modulation symbol of each channel and the generated downlink reference signal. That is, the multiplexing unit 3075 disposes the modulated modulation symbol of each channel and the generated downlink reference signal in the resource elements.

The radio transmission unit 3077 performs Inverse Fast Fourier Transform (IFFT) on the multiplexed modulation symbol and the like, performs modulation of an OFDM scheme, adds the guard interval to the OFDM symbol subjected to the OFDM modulation, generates a baseband digital signal, converts the baseband digital signal into an analog signal, generates an in-phase component and an orthogonal component of an intermediate frequency from the analog signal, removes excessive frequency component in regard to an intermediate frequency band, converts (up-converts) the signal of the intermediate frequency into a signal of a high frequency, removes an excessive frequency component, performs power amplification, and outputs the signal to the transmission and reception antenna 309 to transmit the signal.

Hereinafter, the first uplink reference UL-DL configuration, the first downlink reference UL-DL configuration, the second uplink reference UL-DL configuration, the second downlink reference UL-DL configuration, and the transmission direction UL-DL configuration will be described.

The first uplink reference UL-DL configuration, the first downlink reference UL-DL configuration, the second uplink reference UL-DL configuration, the second downlink reference UL-DL configuration, and the transmission direction UL-DL configuration are defined in accordance with an uplink-downlink configuration (UL-DL configuration).

The uplink-downlink configuration is a configuration regarding a pattern of the subframes in the radio frame. The uplink-downlink configuration indicates that each subframe in the radio frame is one of the downlink subframe, the uplink subframe, and the special subframe. That is, the first uplink reference UL-DL configuration, the second uplink reference UL-DL configuration, the first downlink reference UL-DL configuration, the second downlink reference UL-DL configuration, and the transmission direction UL-DL configuration are defined by the pattern of the downlink subframe, the uplink subframe, and the special subframe in the radio frame.

The pattern of the downlink subframe, the uplink subframe, and the special subframe indicates that each of subframes #0 to #9 is one of the downlink subframe, the uplink subframe, and the special subframe. Preferably, the pattern is expressed by any combination in which the length of D, U, and S (indicate the downlink subframe, the uplink subframe, and the special subframe, respectively) is 10. More preferably, the beginning subframe (that is, subframe #0) is D and the second subframe (that is, subframe #1) is S.

FIG. 9 is a table illustrating an example of the uplink-downlink configuration according to the embodiment. In FIG. 9, D indicates the downlink subframe, U indicates the uplink subframe, and S indicates the special subframe.

In FIG. 9, subframe 1 in the radio frame is normally the special subframe. In FIG. 9, subframes 0 and 5 are reserved normally for downlink transmission and subframe 1 is reserved normally for uplink transmission.

In FIG. 9, when the downlink-uplink switch-point periodicity is 5 ms, subframe 6 in the radio frame is the special subframe. When the downlink-uplink switch-point periodicity is 10 ms, subframe 6 in the radio frame is the downlink subframe.

The first uplink reference UL-DL configuration is also referred to as a first parameter, a first configuration, or a serving cell uplink-downlink configuration. The first downlink reference UL-DL configuration is also referred to as a second parameter or a second configuration. The second uplink reference UL-DL configuration is also referred to as a third parameter or a third configuration. The second downlink reference UL-DL configuration is also referred to as a fourth parameter or a fourth configuration. The transmission direction UL-DL configuration is also referred to as a fifth parameter or a fifth configuration.

Setting of an uplink-downlink configuration i as the first or second uplink reference UL-DL configuration is referred to as setting of a first or second uplink reference UL-DL configuration i. Setting of the uplink-downlink configuration i as the first or second downlink reference UL-DL configuration is referred to as setting of a first or second downlink reference UL-DL configuration i. Setting of an uplink-downlink configuration i as the transmission direction UL-DL configuration is referred to as setting of a transmission direction UL-DL configuration i.

Hereinafter, methods of setting the first uplink reference UL-DL configuration, the first downlink reference UL-DL configuration, and the transmission direction UL-DL configuration will be described.

The base station device 3 sets the first uplink reference UL-DL configuration, the first downlink UL-DL configuration, and the transmission direction UL-DL configuration. The base station device 3 may include the first information (TDD-Config) indicating the first uplink reference UL-DL configuration, the second information indicating the first downlink reference UL-DL configuration, and the third information indicating the transmission direction UL-DL configuration in at least one of the MIB, the system information block type 1 message, the system information message, the RRC message, the MAC Control Element (CE), and the control information (for example, the DCI format) of the physical layer to transmit the first information, the second information, and the third information. Depending on a situation, the base station device 3 may include the first information, the second information, and the third information in any of the MIB, the system information block type 1 message, the system information message, the RRC message, the MAC Control Element (CE), the control information (for example, the DCI format) of the physical layer.

For each of a plurality of serving cells, the first uplink reference UL-DL configuration, the second uplink reference UL-DL configuration, the first downlink reference UL-DL configuration, the second downlink reference UL-DL configuration, and the transmission direction UL-DL configuration may be defined.

For each serving cell, the base station device 3 transmits the first information, the second information, and the third information to the mobile station device 1 in which the plurality of serving cells are set. For each serving cell, the first information, the second information, and the third information may be defined.

The base station device 3 may transmit, to the mobile station device 1 in which two serving cells structured as one primary cell and one secondary cell are set, the first information in regard to the primary cell, the second information in regard to the primary cell, the third information in regard to the primary cell, the first information in regard to the secondary cell, the second information in regard to the secondary cell, and the third information in regard to the secondary cell.

The mobile station device 1 in which the plurality of serving cells are set may set the first uplink reference UL-DL configuration, the first downlink reference UL-DL configuration, and the transmission direction DL-UL configuration based on the first information, the second information, and the third information in regard to each serving cell.

The mobile station device 1 in which to two serving cells structured as one primary cell and one secondary cell are set may set the first uplink reference UL-DL configuration in regard to the primary cell, the first downlink reference UL-DL configuration in regard to the primary cell, the transmission direction DL-UL configuration, the first uplink reference UL-DL configuration in regard to the secondary cell, the first downlink reference UL-DL configuration in regard to the secondary cell, and the transmission direction DL-UL configuration in regard to the secondary cell.

The first information in regard to the primary cell is preferably included in the system information block type 1 message or the RRC message. The first information in regard to the secondary cell is preferably included in the RRC message. The second information in regard to the primary cell is preferably included in the system information block type 1 message, the system information message, or the RRC message. The second information in regard to the secondary cell is preferably included in the RRC message. The third information is preferably included in the MIB, the MAC CE, or the control information (for example, the DCI format) of the physical layer.

The first information is preferably common to the plurality of mobile station devices 1 in the cell. The second information may be common to the plurality of mobile station devices 1 in the cell or may be dedicated to the mobile station device 1. The third information may be common to the plurality of mobile station devices 1 in the cell or may be dedicated to the mobile station device 1.

The second information may be transmitted along with the first information. The mobile station device 1 in which the first downlink reference UL-DL configuration is not set based on the second information may not receive the third information.

A periodicity at which the transmission direction UL-DL configuration is changed is preferably shorter than a periodicity at which the downlink reference UL-DL configuration is changed. A frequency at which the transmission direction UL-DL configuration is changed is preferably not less than a frequency at which the downlink reference UL-DL configuration is changed. A periodicity at which the downlink reference UL-DL configuration is changed is preferably shorter than a periodicity at which the uplink reference UL-DL configuration is changed. A frequency at which the downlink reference UL-DL configuration is changed is preferably not less than a frequency at which the uplink reference UL-DL configuration is changed.

The system information block type 1 message is transmitted via the PDSCH with subframe 5 of a radio frame in which "SFN mod 2=0" is satisfied. The system information block type 1 message includes information indicating the structure (the length of the DwPTS, the GP, and the UpPTS) of the special subframe. The system information block type 1 message is cell-unique information.

The system information message is transmitted via the PDSCH. The system information message is cell-unique information. The system information message includes a system information block X other than system information block type 1.

The RRC message is transmitted via the PDSCH. The RRC message is information/signal processed in an RRC layer. The RRC message may be common to the plurality of mobile station devices 1 in the cell or may be dedicated to a specific mobile station device 1.

The MAC CE is transmitted via the PDSCH. The MAC CE is information/signal processed in a MAC layer.

When the mobile station device 1 receives the RRC message including the first information and/or the second information and/or the third information via the PDSCH, the mobile station device 1 preferably sets (validates) the first uplink reference UL-DL configuration and/or the first downlink reference UL-DL configuration and/or the transmission direction UL-DL configuration in the subframe (timing) with which a RRC Connection Reconfiguration Complete message corresponding to the RRC message is transmitted.

When the mobile station device 1 receives the MIB including the first information and/or the second information and/or the third information in subframe n−k via the PBCH, the mobile station device 1 preferably sets (validates) the first uplink reference UL-DL configuration/first downlink reference UL-DL configuration and/or the transmission direction UL-DL configuration in subframe n. For example, k is 4 or 8.

For example, k is decided based on the table of FIG. 21 and the current first or second downlink reference UL-DL configuration. The description of FIG. 21 will be described below.

When the mobile station device 1 receives the MAC CE including the first information and/or the second information and/or the third information in subframe n−k via the PDSCH, the mobile station device 1 preferably sets (validates) the first uplink reference UL-DL configuration and/or the first downlink reference UL-DL configuration and/or the transmission direction UL-DL configuration in subframe n. For example, k is 4 or 8. For example, subframe n+k is a subframe with which the HARQ-ACK (ACK) for the PDSCH used to transmit the MAC CE is transmitted. For example, k is decided based on the table of FIG. 21 and the current first or second downlink reference UL-DL configuration.

When the mobile station device 1 receives the control information (for example, the DCI format) of the physical layer including the first information and/or the second information and/or the third information in subframe n−k via the downlink physical channel (for example, the PDCCH/EPDCCH), the mobile station device 1 preferably sets (validates) the first uplink reference UL-DL configuration and/or the first downlink reference UL-DL configuration and/or the transmission direction UL-DL configuration in subframe n. For example, k is 4 or 8. For example, subframe n+k is a subframe with which the HARQ-ACK (ACK) for the downlink physical channel (for example, the PDCCH/EPDCCH) used to transmit the control information (for example, the DCI format) of the physical layer is transmitted. For example, k is decided based on the table of FIG. 21 and the current first or second downlink reference UL-DL configuration.

The mobile station device 1 that receives the first information in regard to a certain serving cell and does not receive the second information in regard to the certain serving cell and the base station device 3 that transmits the first information in regard to a certain serving cell and does not transmit the second information in regard to the certain serving cell may set the first downlink reference UL-DL configuration in regard to the certain serving cell based on the first information in regard to the certain serving cell. The mobile station device 1 may neglect the third information in regard to the serving cell in which the first downlink reference UL-DL configuration is set based on the first information.

Figure 10:
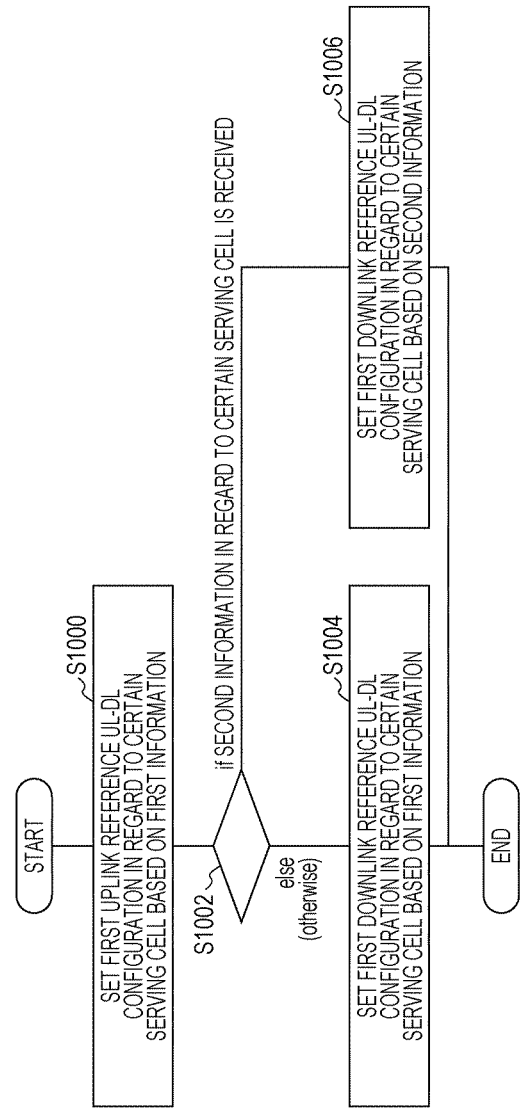
FIG. 10 is a flowchart illustrating a method of setting a first uplink reference UL-DL configuration and a first downlink reference UL-DL configuration according to the embodiment.

FIG. 10 is a flowchart illustrating the method of setting the first uplink reference UL-DL configuration and the first downlink reference UL-DL configuration according to the embodiment. The mobile station device 1 performs the setting method of FIG. 10 in each of the plurality of serving cells.

The mobile station device 1 sets the first uplink reference UL-DL configuration in regard to a certain serving cell based on the first information (S1000). The mobile station device 1 determines whether to receive the second information in regard to the certain serving cell (S1002). When the mobile station device 1 receives the second information in regard to the certain serving cell, the mobile station device 1 sets the first downlink reference UL-DL configuration in regard to the certain serving cell based on the second information in regard to the certain serving cell (S1006). When the mobile station device 1 does not receive the second information in regard to the certain serving cell (else/otherwise), the mobile station device 1 sets the first downlink reference UL-DL configuration in regard to the certain serving cell based on the first information in regard to the certain serving cell (S1004).

A serving cell in which the first uplink reference UL-DL configuration and the first downlink reference UL-DL configuration are set based on the first information is also referred to as a serving cell in which a dynamic TDD is not set. A serving cell in which the first downlink reference UL-DL configuration is set based on the second information is also referred to as a serving cell in which the dynamic TDD is set.

When the first downlink reference UL-DL configuration is reset in regard to the serving cell in which the transmission direction UL-DL configuration is set, the mobile station device 1 may clear/discard the transmission direction UL-DL configuration in regard to the serving cell.

When the reset first downlink reference UL-DL configuration is the same as the previous first downlink reference UL-DL configuration in regard to a serving cell in which the transmission direction UL-DL configuration is set, the mobile station device 1 may not clear/discard the transmission direction UL-DL configuration in regard to the serving cell. That is, when the first downlink reference UL-DL configuration is changed in regard to the serving cell in which the transmission direction UL-DL configuration is set, the mobile station device 1 may clear/discard the transmission direction UL-DL configuration in regard to the serving cell.

When the mobile station device 1 is instructed to reset/change the first downlink reference UL-DL configuration in regard to a serving cell in which the transmission direction UL-DL configuration is set, the base station device 3 may consider the mobile station device 1 to clear/discard the transmission direction UL-DL configuration in regard to the serving cell.

When the first uplink reference UL-DL configuration is reset in regard to a serving cell in which the first downlink reference UL-DL configuration and the transmission direction UL-DL configuration are set, the mobile station device 1 may clear/discard the first downlink reference UL-DL configuration and the transmission direction UL-DL configuration.

When the mobile station device 1 is instructed to reset/change the first uplink reference UL-DL configuration in regard to a serving cell in which the first downlink reference UL-DL configuration and the transmission direction UL-DL configuration are set, the base station device 3 may consider the mobile station device 1 to clear/discard the first downlink reference UL-DL configuration and the transmission direction UL-DL configuration in regard to the serving cell.

When the mobile station device 1 receives the second information, determines the subframe with which the uplink signal can be transmitted based on the second information, and subsequently monitors whether the third information is received, the mobile station device 1 determines the subframe with which an uplink signal can be transmitted based on the third information when the third information is received.

For example, the base station device 3 transmits the third information to the mobile station device 1 by using the PDCCH/EPDCCH. The third information is used to control an operation of the dynamic TDD within a coverage of the base station device 3 (cell). The third information is transmitted and received in a Common Search Space (CSS) or a UE-specific Search Space (USS).

The CSS is a region which is common to the plurality of mobile station devices 1 and in which monitoring of the PDCCH/EPDCCH is performed. The USS is a region which is defined based on at least the C-RNTI. The C-RNTI is an identifier which can be uniquely allocated to the mobile station device 1.

Not the C-RNTI but a common identifier is preferably used in the PDCCH/EPDCCH used to transmit and receive the third information. The subframe with which the mobile station device 1 monitors the PDCCH/EPDCCH including the third information may be limited. The base station device 3 may control the subframe with which the mobile station device 1 monitors the PDCCH/EPDCCH including the third information.

For example, the PDCCH/EPDCCH including the third information can be disposed at intervals of 10 subframes. For example, the mobile station device 1 monitors the third information at the intervals of 10 subframes. The subframe in which the PDCCH/EPDCCH including the third information can be disposed may be decided in advance. For example, the third information may be disposed only in subframe 0 of the radio frame.

Only when the base station device 3 determines that the third information is necessary, the base station device 3 transmits the third information. For example, when the base station device 3 determines that the transmission direction UL-DL configuration is changed, the base station device 3 transmits the third information. For example, when the base station device 3 determines that it is necessary to notify the mobile station device 1 starting an operation of the dynamic TDD of the third information, the base station device 3 transmits the third information.

The mobile station device 1 starting the operation of the dynamic TDD monitors the PDCCH/EPDCCH including the third information with the subframe in which the PDCCH/EPDCCH including the third information can be disposed.

The mobile station device 1 attempts to decode a received signal and determines whether the PDCCH/EPDCCH including the third information is detected. When the PDCCH/EPDCCH including the third information is detected, the mobile station device 1 determines the subframe with which an uplink signal can be transmitted based on the detected third information. When the PDCCH/EPDCCH including the third information is not detected, the mobile station device 1 may maintain the past determination regarding the subframe with which the uplink signal can be transmitted.

Hereinafter, a method of setting the second uplink reference UL-DL configuration will be described.

When the plurality of serving cells are set in the mobile station device 1 and the first uplink reference UL-DL configuration is different between at least two serving cells, the mobile station device 1 and the base station device 3 set the second uplink reference UL-DL configuration.

Unless the plurality of serving cells are set in the mobile station device 1 and the first uplink reference UL-DL configuration is different between at least two serving cells, the mobile station device 1 and the base station device 3 may not set the second uplink reference UL-DL configuration.

Cases other than the case in which the first uplink reference UL-DL configuration is different between at least two serving cells are cases in which the first uplink reference UL-DL configurations are the same in all of the serving cells. When one serving cell is set in the mobile station device 1, the mobile station device 1 and the base station device 3 may not set the second uplink reference UL-DL configuration.

Figure 11:
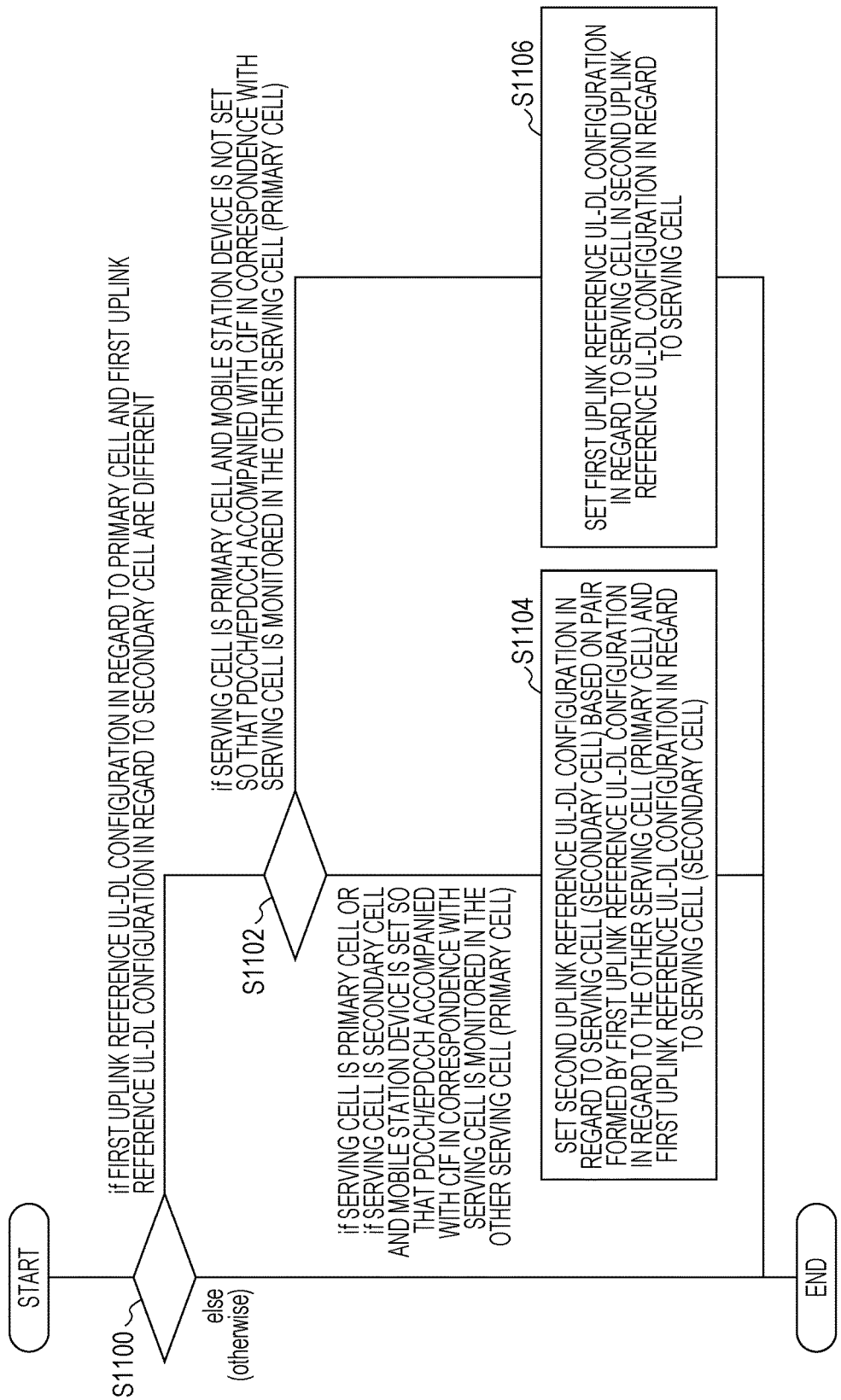
FIG. 11 is a flowchart illustrating a method of setting a second uplink reference UL-DL configuration according to the embodiment.

FIG. 11 is a flowchart illustrating the method of setting the second uplink reference UL-DL configuration according to the embodiment. In FIG. 11, one primary cell and one secondary cell are set in the mobile station device 1. The mobile station device 1 performs the setting method of FIG. 11 in regard to the primary cell and the secondary cell.

The mobile station device 1 determines whether the first uplink reference UL-DL configuration in regard to the primary cell and the first uplink reference UL-DL configuration in regard to the secondary cell are different (S1100). When the first uplink reference UL-DL configuration in regard to the primary cell and the first uplink reference UL-DL configuration in regard to the secondary cell are the same, the mobile station device 1 ends the process of setting the second uplink reference UL-DL configuration without setting the second uplink reference UL-DL configuration.

When the first uplink reference UL-DL configuration in regard to the primary cell and the first uplink reference UL-DL configuration in regard to the secondary cell are different, the mobile station device 1 determines whether the serving cell is the primary cell or the secondary cell and/or is set so that the mobile station device 1 monitors the PDCCH/EPDCCH accompanied with a Carrier Indicator Field (CIF) in correspondence with the serving cell in the other serving cell (S1102).

When the serving cell is the secondary cell and the motile station device 1 is set so that the mobile station device 1 monitors the PDCCH/EPDCCH accompanied with the CIF in correspondence with the serving cell (the secondary cell) in the other serving cell (the primary cell), the second uplink reference UL-DL configuration in regard to the serving cell (the secondary cell) is set based on a pair formed by the first uplink reference UL-DL configuration in regard to the other serving cell (the primary cell) and the first uplink reference UL-DL configuration in regard to the serving cell (the secondary cell) (S1104).

In S1104, the mobile station device 1 sets the second uplink reference UL-DL configuration in regard to the serving cell (the secondary cell) based on the table of FIG. 12. FIG. 12 is a diagram illustrating the pair formed by the first uplink reference UL-DL configuration in regard to the other serving cell (the primary cell) and the first uplink reference UL-DL configuration in regard to the serving cell (the secondary cell) and correspondence of the second uplink reference UL-DL configuration in regard to the secondary cell according to the embodiment.

In FIG. 12, for the primary cell UL-DL configuration, the first uplink reference UL-DL configuration in regard to the other serving cell (the primary cell) is referred to. In FIG. 12, for the secondary cell UL-DL configuration, the first uplink reference UL-DL configuration in regard to the serving cell (the secondary cell) is referred to.

For example, when first uplink reference UL-DL configuration 0 is set in the other serving cell (the primary cell) and first uplink reference UL-DL configuration 2 is set in the serving cell (the secondary cell), second uplink reference UL-DL configuration 1 is set in the secondary cell.

When the serving cell is the primary cell or the serving cell is the secondary cell and when the mobile station device 1 is not set so that mobile station device 1 monitors the PDCCH/EPDCCH accompanied with the CIF in correspondence with the serving cell (the secondary cell) in the other serving cell (the primary cell), the first uplink reference UL-DL configuration in regard to the serving cell is set in the second uplink reference UL-DL configuration in regard to the serving cell (S1106).

The base station device 3 sets the second uplink reference UL-DL configuration based on the setting method of FIG. 11.

The monitoring of the PDCCH/EPDCCH accompanied with the CIF means an attempt to decode the PDCCH or the EPDCCH according to the DCI format including the CIF. The CIF is a field to which a carrier indicator is mapped. A value of the carrier indicator indicates the serving cell to which the DCI format related to the carrier indicator corresponds.

The mobile station device 1 which is set so that the mobile station device 1 monitors the PDCCH/EPDCCH accompanied with the CIF in correspondence with the serving cell in the other serving cell monitors the PDCCH/EPDCCH accompanied with the CIF in the other serving cell.

The mobile station device 1 which is set so that the mobile station device 1 monitors the PDCCH/EPDCCH accompanied with the CIF in correspondence with the serving cell in the other serving cell preferably receives the third information in regard to the serving cell via the PDCCH/EPDCCH in the other serving cell.

The mobile station device 1 which is not set so that the mobile station device 1 monitors the PDCCH/EPDCCH accompanied with the CIF in correspondence with the serving cell in the other serving cell monitors the PDCCH/EPDCCH accompanied with the CIF or not accompanied with the CIF in the other serving cell.

The mobile station device 1 which is not set so that the mobile station device 1 monitors the PDCCH/EPDCCH accompanied with the CIF in correspondence with the serving cell in the other serving cell preferably receives the third information in regard to the serving cell via the PDCCH/EPDCCH in the other serving cell.

The PDCCH/EPDCCH in regard to the primary cell is transmitted in the primary cell. The third information in regard to the primary cell is preferably transmitted via the PDCCH/EPDCCH of the primary cell.

The base station device 3 transmits a parameter (cif-Presence-r10) indicating whether the CIF is included in the DCI format transmitted in the primary cell to the mobile station device 1.

The base station device 3 transmits a parameter (CrossCarrierSchedulingConfig-r10) related to cross carrier scheduling in each secondary cell to the mobile station device 1.

The parameter (CrossCarrierSchedulingConfig-r10) includes a parameter (schedulingCellInfo-r10) indicating whether the PDCCH/EPDCCH corresponding to a related secondary cell is transmitted in the secondary cell or the other serving cell.

When the parameter (schedulingCellInfo-r10) indicates that the PDCCH/EPDCCH corresponding to a related secondary cell is transmitted in the secondary cell, the parameter (schedulingCellInfo-r10) includes a parameter (cifPresence-r10) indicating whether the CIF is included in the DCI format transmitted in the secondary cell.

When the parameter (schedulingCellInfo-r10) indicates that the PDCCH/EPDCCH corresponding to a related secondary cell is transmitted in the other serving cell, the parameter (schedulingCellInfo-r10) includes a parameter (schedulingCellId) indicating a serving cell in which downlink allocation to the related secondary cell is transmitted.

Hereinafter, a method of setting the second downlink reference UL-DL configuration will be described.

When the plurality of serving cells are set in the mobile station device 1 and the first downlink reference UL-DL configuration is different between at least two serving cells, the mobile station device 1 and the base station device 3 set the second downlink reference UL-DL configuration. Unless the plurality of serving cells are set in the mobile station device 1 and the first downlink reference UL-DL configuration is different between at least two serving cells, the mobile station device 1 and the base station device 3 may not set the second downlink reference UL-DL configuration.

Cases other than the case in which the first downlink reference UL-DL configuration is different between at least two serving cells are cases in which the first downlink reference UL-DL configurations are the same in all of the serving cells. When one serving cell is set in the mobile station device 1, the mobile station device 1 and the base station device 3 may not set the second downlink reference UL-DL configuration.

Figure 13:
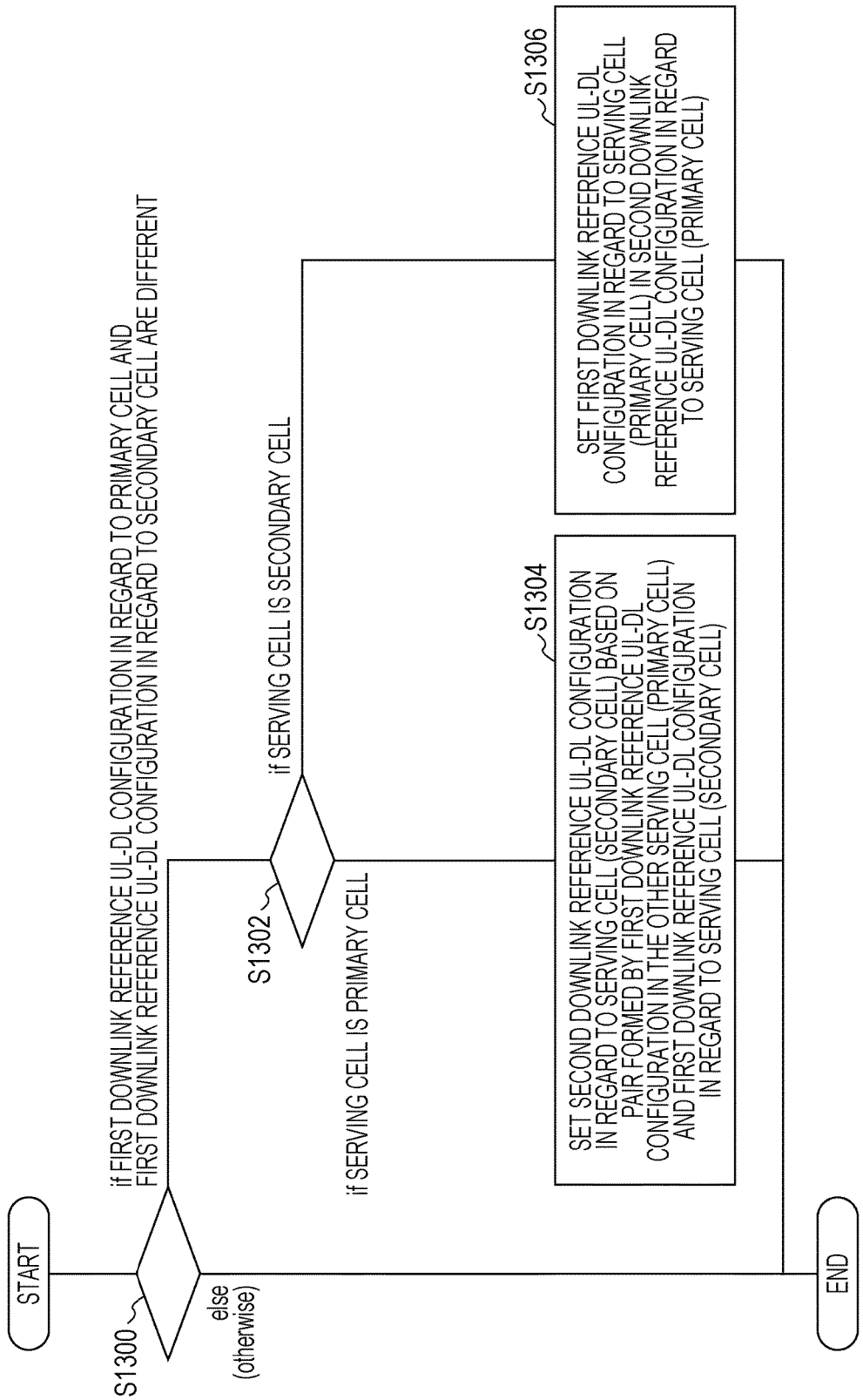
FIG. 13 is a flowchart illustrating a method of setting a second downlink reference UL-DL configuration according to the embodiment.

FIG. 13 is a flowchart illustrating the method of setting the second downlink reference UL-DL configuration according to the embodiment. In FIG. 13, one primary cell and one secondary cell are set in the mobile station device 1. The mobile station device 1 performs the setting method of FIG. 13 in regard to the primary cell and the secondary cell.

The mobile station device 1 determines whether the first downlink reference UL-DL configuration in regard to the primary cell and the first downlink reference UL-DL configuration in regard to the secondary cell are different (S1300). When the first downlink reference UL-DL configuration in regard to the primary cell and the first downlink reference UL-DL configuration in regard to the secondary cell are the same, the mobile station device 1 ends the process of setting the second downlink reference UL-DL configuration without setting the second downlink reference UL-DL configuration.

When the first downlink reference UL-DL configuration in regard to the primary cell and the first downlink reference UL-DL configuration in regard to the secondary cell are different, the mobile station device 1 determines whether the serving cell is the primary cell or the secondary cell (S1302).

When the serving cell is the secondary cell, the second uplink reference UL-DL configuration in regard to the serving cell (the secondary cell) is set based on a pair formed by the first downlink reference UL-DL configuration in regard to the other serving cell (the primary cell) and the first downlink reference UL-DL configuration in regard to the serving cell (the secondary cell) (S1304).

In S1304, the mobile station device 1 sets the second downlink reference UL-DL configuration in regard to the serving cell (the secondary cell) based on the table of FIG. 14. FIG. 14 is a diagram illustrating the pair formed by the first downlink reference UL-DL configuration in regard to the primary cell and the first downlink reference UL-DL configuration in regard to the secondary cell and correspondence of the second downlink reference UL-DL configuration in regard to the secondary cell according to the embodiment.

In FIG. 14, for the primary cell UL-DL configuration, the first downlink reference UL-DL configuration in regard to the primary cell is referred to. In FIG. 14, for the secondary cell UL-DL configuration, the first downlink reference UL-DL configuration in regard to the secondary cell is referred to.

The pair formed by the first downlink reference UL-DL configuration in regard to the primary cell and the first downlink reference UL-DL configuration in regard to the secondary cell belongs to set 1 of FIG. 14, the second downlink reference UL-DL configuration in regard to the secondary cell is defined in set 1.

When the mobile station device 1 is not set so that the mobile station device 1 monitors the PDCCH/EPDCCH accompanied with the CIF in correspondence with the secondary cell in the primary cell and the pair formed by the first downlink reference UL-DL configuration in regard to the primary cell and the first downlink reference UL-DL configuration in regard to the secondary cell belongs to set 2 of FIG. 14, the second downlink reference UL-DL configuration in regard to the secondary cell is defined in set 2.

When the mobile station device 1 is not set so that the mobile station device 1 monitors the PDCCH/EPDCCH accompanied with the CIF in correspondence with the secondary cell in the primary cell and the pair formed by the first downlink reference UL-DL configuration in regard to the primary cell and the first downlink reference UL-DL configuration in regard to the secondary cell belongs to set 3 of FIG. 14, the second downlink reference UL-DL configuration in regard to the secondary cell is defined in set 3.

When the mobile station device 1 is set so that the mobile station device 1 monitors the PDCCH/EPDCCH accompanied with the CIF in correspondence with the secondary cell in the primary cell and the pair formed by the first downlink reference UL-DL configuration in regard to the primary cell and the first downlink reference UL-DL configuration in regard to the secondary cell belongs to set 4 of FIG. 14, the second downlink reference UL-DL configuration in regard to the secondary cell is defined in set 4.

When the mobile station device 1 is set so that mobile station device 1 monitors the PDCCH/EPDCCH accompanied with the CIF in correspondence with the secondary cell in the primary cell and the pair formed by the first downlink reference UL-DL configuration in regard to the primary cell and the first downlink reference UL-DL configuration in regard to the secondary cell belongs to set 5 of FIG. 14, the second downlink reference UL-DL configuration in regard to the secondary cell is defined in set 5.

For example, when first downlink reference UL-DL configuration 1 is set in regard to the primary cell and first downlink reference UL-DL configuration 0 is set in regard to the secondary cell, second downlink reference UL-DL configuration 1 is set in regard to the secondary cell.

When the serving cell is the primary cell, the first downlink reference UL-DL configuration in regard to the serving cell (the primary cell) is set in the second downlink reference UL-DL configuration in regard to the serving cell (primary cell) (S1306).

The base station device 3 also sets the second downlink reference UL-DL configuration based on the setting method of FIG. 13.

Hereinafter, the first uplink reference UL-DL configuration will be described.

The first uplink reference UL-DL configuration is used at least to specify the subframe with which the uplink transmission is possible or not possible in the serving cell.

The mobile station device 1 does not perform uplink transmission in the subframe instructed as the downlink subframe in accordance with the first uplink reference UL-DL configuration. The mobile station device 1 does not perform uplink transmission in the DwPTS and the GP of the subframe instructed as the special subframe in accordance with the first uplink reference UL-DL configuration.

Hereinafter, the first downlink reference UL-DL configuration will be described.

The first downlink reference UL-DL configuration is used at least to specify the subframe with which the downlink transmission is possible or not possible in the serving cell.

The mobile station device 1 does not perform downlink transmission in the subframe instructed as the uplink subframe in accordance with the first downlink reference UL-DL configuration. The mobile station device 1 does not perform downlink transmission in the UpPTS and the GP of the subframe instructed as the special subframe in accordance with the first downlink reference UL-DL configuration.

The mobile station device 1 in which the first downlink reference UL-DL configuration is set based on the first information may perform measurement (for example, measurement related to channel state information) using a downlink signal in the DwPTS of the special subframe or the downlink subframe instructed in accordance with the first uplink reference UL-DL configuration or the first downlink reference UL-DL configuration.

Accordingly, in the dynamic TDD, when the base station device 3 uses the subframe instructed as the downlink subframe in accordance with the first uplink reference UL-DL configuration as the special subframe or the uplink subframe or uses the subframe instructed as the special subframe in accordance with the first uplink reference UL-DL configuration as the uplink subframe, there is a problem that the mobile station device 1 in which the first downlink reference UL-DL configuration is set based on the first information may not appropriately perform the measurement using the downlink signal.

Therefore, the base station device 3 decides the downlink reference UL-DL configuration in a configuration set (configuration of a set) restricted based on the first uplink reference UL-DL configuration. That is, the first downlink reference UL-DL configuration is an element in the configuration set restricted based on the first uplink reference UL-DL configuration. The configuration set restricted based on the first uplink reference UL-DL configuration includes an uplink-downlink configuration satisfying the following conditions (a) to (c). FIG. 15 is a diagram illustrating a relation between the subframe instructed in accordance with the first uplink reference UL-DL configuration and the subframe instructed in accordance with the first downlink reference UL-DL configuration according to the embodiment. In FIG. 15, D denotes a downlink subframe, U denotes an uplink subframe, and S denotes a special subframe.

condition (a): The subframe instructed as the downlink subframe in accordance with the first uplink reference UL-DL configuration is instructed as the downlink subframe.

condition (b): The subframe instructed as the uplink subframe in accordance with the first uplink reference UL-DL configuration is instructed as the uplink subframe or the downlink subframe.

condition (c): The subframe instructed as the special subframe in accordance with the first uplink reference UL-DL configuration is instructed as the downlink subframe or the special subframe.

Thus, in the dynamic TDD, since the DwPTS of the special subframe and the subframe instructed as the downlink subframe in accordance with the first uplink reference UL-DL configuration are not used for uplink transmission, the mobile station device 1 in which the first downlink reference UL-DL configuration is set based on the first information can appropriately perform the measurement using the downlink signal.

The mobile station device 1 in which the first downlink reference UL-DL configuration is set based on the second information may also perform the measurement (for example, measurement related to channel state information) using a downlink signal in the DwPTS of the special subframe or the downlink subframe instructed in accordance with the first uplink reference UL-DL configuration.

A subframe instructed as the uplink subframe in accordance with the first uplink reference UL-DL configuration and instructed as the downlink subframe in accordance with the first downlink reference UL-DL configuration is also referred to as a first flexible subframe. The first flexible subframe is a subframe that is reserved for uplink and downlink transmission.

A subframe instructed as the special subframe in accordance with the first uplink reference UL-DL configuration and instructed as the downlink subframe in accordance with the first downlink reference UL-DL configuration is also referred to as a second flexible subframe. The second flexible subframe is a subframe that is reserved for downlink transmission. The second flexible subframe is a subframe that is reserved for downlink transmission in the DwPTS and uplink transmission in the UpPTS.

Hereinafter, the transmission direction UL-DL configuration will be described in detail.

When the mobile station device 1 decides a transmission direction (up/down) based on the first uplink reference UL-DL configuration, the first downlink reference UL-DL configuration, and the scheduling information (the DCI format and/or the HARQ-ACK), there is a problem that the mobile station device 1 erroneously receiving/decoding the scheduling information (the DCI format and/or the HARQ-ACK) in the subframe with which the base station device 3 transmits a downlink signal to another mobile station device 1 transmits an uplink signal, and thus the uplink signal interferes with the downlink signal.

Accordingly, the mobile station device 1 and the base station device 3 set the transmission direction UL-DL configuration related to the transmission direction (up/down) in the subframe. The transmission direction UL-DL configuration is used to decide the transmission direction in the subframe.

The mobile station device 1 controls the transmission in the first flexible subframe and the second flexible subframe based on the scheduling information (the DCI format and/or the HARQ-ACK) and the transmission direction UL-DL configuration.

The base station device 3 transmits the third information indicating the transmission direction UL-DL configuration to the mobile station device 1. The third information is information for giving an instruction of the subframe in which the uplink transmission is possible. The third information is information for giving an instruction of the subframe in which the downlink transmission is possible. The third information is information for giving an instruction of the subframe in which the uplink transmission is possible in the UpPTS and the downlink transmission is possible in the DwPTS.

For example, the transmission direction UL-DL configuration is used to specify a transmission direction in the subframe instructed as the uplink subframe in accordance with the first uplink reference UL-DL configuration and instructed as the downlink subframe in accordance with the first downlink reference UL-DL configuration and/or the subframe instructed as the special subframe in accordance with the first uplink reference UL-DL configuration and instructed as the downlink subframe in accordance with the first downlink reference UL-DL configuration. That is, the transmission direction UL-DL configuration is used to specify a transmission direction in the subframe instructed as a different subframe between the first uplink reference UL-DL configuration and the first downlink reference UL-DL configuration.

FIG. 16 is a diagram illustrating a relation among a subframe instructed in accordance with the first uplink reference UL-DL configuration, a subframe instructed in accordance with the first downlink reference UL-DL configuration, and a subframe instructed in accordance with a transmission direction UL-DL configuration according to the embodiment. In FIG. 16, D denotes a downlink subframe, U denotes an uplink subframe, and S denotes a special subframe.

The base station device 3 decides the transmission direction UL-DL configuration in the configuration set (configuration of a set) restricted based on the first uplink reference UL-DL configuration and the first downlink UL-DL configuration. That is, the transmission direction UL-DL configuration is an element in the configuration set restricted based on the first uplink reference UL-DL configuration and the first downlink reference UL-DL configuration. The configuration set restricted based on the first uplink reference UL-DL configuration and the first downlink reference UL-DL configuration includes an uplink-downlink configuration satisfying the following conditions (d) to (h).

condition (d): The subframe instructed as the downlink subframe in accordance with the first uplink reference UL-DL configuration and the first downlink reference UL-DL configuration is instructed as the downlink subframe.

condition (e): The subframe instructed as the uplink subframe in accordance with the first uplink reference UL-DL configuration and the first downlink reference UL-DL configuration is instructed as the uplink subframe.

condition (f): The subframe instructed as the uplink subframe in accordance with the first uplink reference UL-DL configuration and instructed as the downlink subframe in accordance with the first downlink reference UL-DL configuration is instructed as the uplink subframe or the downlink subframe.

condition (g): The subframe instructed as the special subframe in accordance with the first uplink reference UL-DL configuration and the first downlink reference UL-DL configuration is instructed as the special subframe.

condition (h): The subframe instructed as the special subframe in accordance with the first uplink reference UL-DL configuration and instructed as the downlink subframe in accordance with the first downlink reference UL-DL configuration is instructed as the special subframe or the downlink subframe.

The base station device 3 may schedule the downlink transmission in the subframe instructed as the downlink subframe in accordance with the transmission direction UL-DL configuration.

The mobile station device 1 may perform the process of receiving the downlink signal in the subframe instructed as the downlink subframe in accordance with the transmission direction UL-DL configuration. The mobile station device 1 may monitor the PDCCH/EPDCCH in the subframe instructed as the downlink subframe in accordance with the transmission direction UL-DL configuration. The mobile station device 1 may perform the process of receiving the PDSCH in the subframe instructed as the downlink subframe in accordance with the transmission direction UL-DL configuration based on detection of the downlink grant via the PDCCH/EPDCCH.

When the transmission of an uplink signal (PUSCH/SRS) is scheduled or set in the subframe instructed as the downlink subframe in accordance with the transmission direction UL-DL configuration, the mobile station device 1 does not perform the process of transmitting the uplink signal (the PUSCH/SRS) in the subframe.

The base station device 3 may schedule the uplink transmission in the subframe instructed as the uplink subframe in accordance with the transmission direction UL-DL configuration.

The base station device 3 may schedule the downlink transmission in the subframe instructed as the uplink subframe in accordance with the transmission direction UL-DL configuration. The scheduling of the downlink transmission by the base station device 3 may be prohibited in the subframe instructed as the uplink subframe in accordance with the transmission direction UL-DL configuration.

The mobile station device 1 may perform the process of transmitting an uplink signal in the subframe instructed as the uplink subframe in accordance with the transmission direction UL-DL configuration. When the transmission of an uplink signal (PUSCH/DMRS/SRS) is scheduled or set in the subframe instructed as the uplink subframe in accordance with the transmission direction UL-DL configuration, the mobile station device 1 may perform the process of transmitting the uplink signal (the PUSCH/DMRS/SRS) in the subframe.

The mobile station device 1 may perform the process of receiving a downlink signal in the subframe which is instructed as the uplink subframe in accordance with the transmission direction UL-DL configuration and in which the uplink transmission is not scheduled. The process of receiving the downlink signal by the mobile station device 1 may be prohibited in the subframe instructed as the uplink subframe in accordance with the transmission direction UL-DL configuration.

The base station device 3 may schedule the downlink transmission in the DwPTS of the subframe instructed as the special subframe in accordance with the transmission direction UL-DL configuration.

The mobile station device 1 may perform the process of receiving a downlink signal in the DwPTS of the subframe instructed as the special subframe in accordance with the transmission direction UL-DL configuration. The mobile station device 1 may monitor the PDCCH/EPDCCH in the DwPTS of the subframe instructed as the special subframe in accordance with the transmission direction UL-DL configuration. The mobile station device 1 may perform the process of receiving the PDSCH in the DwPTS of the subframe instructed as the special subframe in accordance with the transmission direction UL-DL configuration based on detection of the downlink grant via the PDCCH/EPDCCH.

When the transmission of the PUSCH in the subframe instructed as the special subframe is scheduled or set in accordance with the transmission direction UL-DL configuration, the mobile station device 1 does not perform the process of transmitting the PUSCH in the subframe.

When the transmission of the SRS in the UpPTS of the subframe instructed as the special subframe is scheduled or set in accordance with the transmission direction UL-DL configuration, the mobile station device 1 may perform the process of transmitting the SRS in the UpPTS of the subframe.

FIG. 17 is a diagram illustrating a relation among the first uplink reference UL-DL configuration, the first downlink reference UL-DL configuration, and the transmission direction UL-DL configuration according to the embodiment.

For example, when the first uplink reference UL-DL configuration is 0 in FIG. 17, the first downlink reference UL-DL configuration is one of a set {0, 1, 2, 3, 4, 5, 6}. For example, when the first uplink reference UL-DL configuration is 1 in FIG. 17, the first downlink reference UL-DL configuration is one of a set {1, 2, 4, 5}.

For example, when the first uplink reference UL-DL configuration is 0 and the first downlink reference UL-DL configuration is 1 in FIG. 17, the transmission direction UL-DL configuration is one of a set {0, 1, 6}.

A value of the first downlink reference UL-DL configuration may be the same as a value of the first uplink reference UL-DL configuration. However, the mobile station device 1 not receiving the second information sets the same value as the value of the first uplink reference UL-DL configuration as the first downlink reference UL-DL configuration. Therefore, it is preferable that the value of the first downlink reference UL-DL configuration indicated by the second information be not the same as the value of the first uplink reference UL-DL configuration indicated by the first information.

When the value of the first uplink reference UL-DL configuration is the same as the value of the first downlink reference UL-DL configuration, the transmission direction UL-DL configuration may not be defined. Alternatively, when the value of the first uplink reference UL-DL configuration is the same as the value of the first downlink reference UL-DL configuration, the same values as the value of the first uplink reference UL-DL configuration and the value of the first downlink reference UL-DL configuration may be set in the transmission direction UL-DL configuration.

A configuration set (configuration of a set) formed by the uplink-downlink configuration of the first uplink reference UL-DL configuration and the uplink-downlink configuration of the first downlink reference UL-DL configuration may be used as a configuration set restricted based on the first uplink reference UL-DL configuration and the first downlink reference UL-DL configuration.

For example, when the first uplink reference UL-DL configuration is 0 and the first downlink reference UL-DL configuration is 1, a configuration set restricted based on the first uplink reference UL-DL configuration and the first downlink reference UL-DL configuration is {0, 1}. In this case, the third information is preferably 1 bit.

The third information may be information indicating the transmission direction UL-DL configuration in the configuration set (configuration of a set) formed by the first uplink reference UL-DL configuration and the first downlink reference UL-DL configuration.

Hereinafter, the first uplink reference UL-DL configuration and the second uplink reference UL-DL configuration will be described in detail.

The first uplink reference UL-DL configuration and the second uplink reference UL-DL configuration are used to specify (select or decide) correspondence between subframe n in which the PDCCH/EPDCCH/PHICH is disposed and subframe n+k in which PUSCH corresponding to the PDCCH/EPDCCH/PHICH is disposed.

When one primary cell is set or when one primary cell and one secondary cell are set and the first uplink reference UL-DL configuration in regard to the primary cell and the first uplink reference UL-DL configuration in regard to the secondary cell are the same, the corresponding first uplink reference UL-DL configuration is used in each of two serving cells to decide correspondence between the subframe in which the PDCCH/EPDCCH/PHICH is disposed and the subframe in which the PUSCH corresponding to the PDCCH/EPDCCH/PHICH is disposed.

When one primary cell and one secondary cell are set and the first uplink reference UL-DL configuration in regard to the primary cell and the first uplink reference UL-DL configuration in regard to the secondary cell are different, the corresponding second uplink reference UL-DL configuration is used in each of two serving cells to decide correspondence between the subframe in which the PDCCH/EPDCCH/PHICH is disposed and the subframe in which the PUSCH corresponding to the PDCCH/EPDCCH/PHICH is disposed.

FIG. 18 is a diagram illustrating correspondence between subframe n in which PDCCH/EPDCCH/PHICH is disposed and subframe n+k in which a PUSCH corresponding to PDCCH/EPDCCH/PHICH is disposed according to the embodiment. The mobile station device 1 specifies (selects or decides) a value of k according to the table of FIG. 18.

When one primary cell is set or when one primary cell and one secondary cell are set and the first uplink reference UL-DL configuration in regard to the primary cell and the first uplink reference UL-DL configuration in regard to the secondary cell are the same in FIG. 18, the first uplink reference UL-DL configuration is referred to in the uplink-downlink configuration.

When one primary cell and one secondary cell are set and the first uplink reference UL-DL configuration in regard to the primary cell and the first uplink reference UL-DL configuration in regard to the secondary cell are different in FIG. 18, the second uplink reference UL-DL configuration is referred to in the uplink-downlink configuration.

Hereinafter, in the description of FIG. 18, the first uplink reference UL-DL configuration and the second uplink reference UL-DL configuration are simply referred to as the uplink-downlink configuration.

When the PDCCH/EPDCCH accompanied with the uplink grant in which the mobile station device 1 is a target is detected in correspondence with the serving cell in which the uplink-downlink configurations 1 to 6 are set in subframe n, the mobile station device 1 performs the PUSCH transmission according to the uplink grant in subframe n+k specified (selected or decided) based on the table of FIG. 18.

When the PHICH accompanied with the NACK in which the mobile station device 1 is a target is detected in correspondence with the serving cell in which uplink-downlink configurations 1 to 6 are set in subframe n, the mobile station device 1 performs the PUSCH transmission in subframe n+k specified (selected or decided) based on the table of FIG. 18.

The uplink grant in which the mobile station device 1 is a target includes a 2-bit uplink index (UL index) in correspondence with the serving cell in which uplink-downlink configuration 0 is set. The uplink grant in which the mobile station device 1 is a target does not include an uplink index (UL index) in correspondence with the serving cell in which uplink-downlink configurations 1 to 6 are set.

When 1 is set in the Most Significant Bit (MSB) of the uplink index included in the uplink grant corresponding to the serving cell in which uplink-downlink configuration 0 is set in subframe n, the mobile station device 1 adjusts the PUSCH transmission according to the uplink grant in subframe n+k specified (selected or decided) based on the table of FIG. 18.

When the PHICH accompanied with the NACK corresponding to the serving cell in which uplink-downlink configuration 0 is set in the first resource set in subframe n=0 or 5 is received, the mobile station device 1 adjusts the PUSCH transmission according to the PHICH in subframe n+k specified (selected or decided) based on the table of FIG. 18.

When 1 is set in the Least Significant Bit (LSB) of the uplink index included in the uplink grant corresponding to the serving cell in which uplink-downlink configuration 0 is set in subframe n, the mobile station device 1 adjusts the PUSCH transmission according to the uplink grant in subframe n+7 specified (selected or decided).

When the PHICH accompanied with the NACK corresponding to the serving cell in which uplink-downlink configuration 0 is set in the second resource set in subframe n=0 or 5 is received, the mobile station device 1 adjusts the PUSCH transmission according to the uplink grant in subframe n+7.

When the PHICH accompanied with the NACK corresponding to the serving cell in which uplink-downlink configuration 0 is set in the second resource set in subframe n=1 or 6 is received, the mobile station device 1 adjusts the PUSCH transmission according to the uplink grant in subframe n+7.

For example, when the PDCCH/EPDCCH/PHICH corresponding to the serving cell in which uplink-downlink configuration 0 is set is detected in [SFN=m, subframe 1], the mobile station device 1 adjusts the PUSCH transmission in subframe [SFN=m, subframe 7] after 6 subframes.

The first uplink reference UL-DL configuration and the second uplink reference UL-DL configuration are used to specify (select or decide) correspondence between subframe n in which the PHICH is disposed and subframe n−k in which the PUSCH corresponding to the PHICH is disposed.

When one primary cell is set or when one primary cell and one secondary cell are set and the first uplink reference UL-DL configuration in regard to the primary cell and the first uplink reference UL-DL configuration in regard to the secondary cell are the same, the corresponding first uplink reference UL-DL configuration is used in each of two serving cells to specify (select or decide) the correspondence between subframe n in which the PHICH is disposed and subframe n−k in which the PUSCH corresponding to the PHICH is disposed.

When one primary cell and one secondary cell are set and the first uplink reference UL-DL configuration in regard to the primary cell and the first uplink reference UL-DL configuration in regard to the secondary cell are different, the corresponding second uplink reference UL-DL configuration is used in each of two serving cells to specify (select or decide) the correspondence between subframe n in which the PHICH is disposed and subframe n−k in which the PUSCH corresponding to the PHICH is disposed.

FIG. 19 is a diagram illustrating the correspondence between subframe n in which the PHICH is disposed and subframe n−k in which the PUSCH corresponding to the PHICH is disposed according to the embodiment. The mobile station device 1 specifies (selects or decides) a value of k in accordance with the table of FIG. 19.

When one primary cell is set in FIG. 19 or when one primary cell and one secondary cell are set and the first uplink reference UL-DL configuration in regard to the primary cell and the first uplink reference UL-DL configuration in regard to the secondary cell are the same in FIG. 19, the first uplink reference UL-DL configuration is referred to in the uplink-downlink configuration.

When one primary cell and one secondary cell are set and the first uplink reference UL-DL configuration in regard to the primary cell and the first uplink reference UL-DL configuration in regard to the secondary cell are different in FIG. 19, the second uplink reference UL-DL configuration is referred to in the uplink-downlink configuration.

Hereinafter, in the description of FIG. 19, the first uplink reference UL-DL configuration and the second uplink reference UL-DL configuration are simply referred to as the uplink-downlink configuration.

For a serving cell in which uplink-downlink configurations 1 to 6 are set, the HARQ indicator (HARQ-ACK) received via the PHICH corresponding to the serving cell in subframe n is related to the PUSCH transmission in subframe n−k specified based on the table of FIG. 19.

For a serving cell in which uplink-downlink configuration 0 is set, the HARQ indicator (HARQ-ACK) received via the PHICH corresponding to the serving cell in the first resource set of subframe n=0 or 5 or in subframe n=1 or 6 is related to the PUSCH transmission in subframe n−k specified based on the table of FIG. 19.

For a serving cell in which uplink-downlink configuration 0 is set, the HARQ indicator (HARQ-ACK) received via the PHICH corresponding to the serving cell in the second resource set of subframe n=0 or 5 is related to the PUSCH transmission in subframe n−6.

For example, for a serving cell in which uplink-downlink configuration 1 is set, the HARQ indicator (HARQ-ACK) received via the PHICH in [SFN=m, subframe 1] is related to the PUSCH transmission in subframe [SFN=m−1, subframe 7] before 4 subframes.

The first uplink reference UL-DL configuration and the second uplink reference UL-DL configuration are used to specify (select or decide) the correspondence between subframe n in which the PUSCH is disposed and subframe n+k in which the PHICH corresponding to the PUSCH is disposed.

When one primary cell is set or when one primary cell and one secondary cell are set and the first uplink reference UL-DL configuration in regard to the primary cell and the first uplink reference UL-DL configuration in regard to the secondary cell are the same, the corresponding first uplink reference UL-DL configuration is used in each of two serving cells to specify (select or decide) the correspondence between subframe n in which the PUSCH is disposed and subframe n+k in which the PHICH corresponding to the PUSCH is disposed.

When one primary cell and one secondary cell are set and the first uplink reference UL-DL configuration in regard to the primary cell and the first uplink reference UL-DL configuration in regard to the secondary cell are different, the corresponding second uplink reference UL-DL configuration is used in each of two serving cells to specify (select or decide) the correspondence between subframe n in which the PUSCH is disposed and subframe n+k in which the PHICH corresponding to the PUSCH is disposed.

FIG. 20 is a diagram illustrating correspondence between subframe n in which a PUSCH is disposed and subframe n+k in which a PHICH corresponding to the PUSCH is disposed according to the embodiment. The mobile station device 1 specifies (selects or decides) a value of k in accordance with the table of FIG. 20.

When one primary cell is set or when one primary cell and one secondary cell are set and the first uplink reference UL-DL configuration in regard to the primary cell and the first uplink reference UL-DL configuration in regard to the secondary cell are the same in FIG. 20, the first uplink reference UL-DL configuration is referred to in the uplink-downlink configuration.

When one primary cell and one secondary cell are set and the first uplink reference UL-DL configuration in regard to the primary cell and the first uplink reference UL-DL configuration in regard to the secondary cell are different in FIG. 20, the second uplink reference UL-DL configuration is referred to in the uplink-downlink configuration.

Hereinafter, in the description of FIG. 20, the first uplink reference UL-DL configuration and the second uplink reference UL-DL configuration are simply referred to as the uplink-downlink configuration.

When the PUSCH transmission in subframe n is scheduled, the mobile station device 1 decides the PHICH resources in subframe n+k specified from the table of FIG. 20.

For example, when the PUSCH transmission in [SFN=m, subframe n=2] to the serving cell in which uplink-downlink configuration 0 is set is scheduled, the PHICH resources in [SFN=m, subframe n=6] are decided.

For example, when the PUSCH transmission in [SFN=m, subframe n=3] to the serving cell in which uplink-downlink configuration 0 is set is scheduled, the PHICH resources in the first resource set of [SFN=m+1, subframe n=0] are decided.

For example, when the PUSCH transmission in [SFN=m, subframe n=4] to the serving cell in which uplink-downlink configuration 0 is set is scheduled, the PHICH resources in the second resource set of [SFN=m+1, subframe n=0] are decided.

For example, when the PUSCH transmission in [SFN=m, subframe n=7] to the serving cell in which uplink-downlink configuration 0 is set is scheduled, the PHICH resources in [SFN=m+1, subframe n=1] are decided.

For example, when the PUSCH transmission in [SFN=m, subframe n=8] to the serving cell in which uplink-downlink configuration 0 is set is scheduled, the PHICH resources in the first resource set of [SFN=m+1, subframe n=5] are decided.

For example, when the PUSCH transmission in [SFN=m, subframe n=9] to the serving cell in which uplink-downlink configuration 0 is set is scheduled, the PHICH resources in the second resource set of [SFN=m+1, subframe n=5] are decided.

Hereinafter, the first downlink reference UL-DL configuration and the second downlink reference UL-DL configuration will be described in detail.

The first downlink reference UL-DL configuration and the second downlink reference UL-DL configuration are used to specify (select or decide) the correspondence between subframe n in which the PDSCH is disposed and subframe n+k with which the HARQ-ACK corresponding to the PDSCH is transmitted.

When one primary cell is set or when one primary cell and one secondary cell are set and the first downlink reference UL-DL configuration in regard to the primary cell and the first downlink reference UL-DL configuration in regard to the secondary cell are the same, the corresponding first downlink reference UL-DL configuration is used in each of two serving cells to specify (select or decide) the correspondence between subframe n in which the PDSCH is disposed and subframe n+k with which the HARQ-ACK corresponding to the PDSCH is transmitted.

When one primary cell and one secondary cell are set and the first downlink reference UL-DL configuration in regard to the primary cell and the first downlink reference UL-DL configuration in regard to the secondary cell are different, the corresponding second downlink reference UL-DL configuration is used in each of two serving cells to specify (select or decide) the correspondence between subframe n in which the PDSCH is disposed and subframe n+k with which the HARQ-ACK corresponding to the PDSCH is transmitted.

FIG. 21 is a diagram illustrating correspondence between subframe n−k in which a PDSCH is disposed and subframe n in which an HARQ-ACK corresponding to the PDSCH is transmitted according to the embodiment. The mobile station device 1 specifies (selects or decides) the value of k according to the table of FIG. 21.

When one primary cell is set or when one primary cell and one secondary cell are set and the first downlink reference UL-DL configuration in regard to the primary cell and the first downlink reference UL-DL configuration in regard to the secondary cell are the same in FIG. 21, the first downlink reference UL-DL configuration is referred to in the uplink-downlink configuration.

When one primary cell and one secondary cell are set and the first downlink reference UL-DL configuration in regard to the primary cell and the first downlink reference UL-DL configuration in regard to the secondary cell are different in FIG. 21, the second downlink reference UL-DL configuration is referred to in the uplink-downlink configuration.

Hereinafter, in the description of FIG. 21, the first downlink reference UL-DL configuration and the second downlink reference UL-DL configuration are simply referred to as the uplink-downlink configuration.

When PDSCH transmission in which the mobile station device 1 is a target and the corresponding HARQ-ACK is to be transmitted in subframe n−k (where k is specified in accordance with the table of FIG. 21) of the serving cell, the mobile station device 1 transmits the HARQ-ACK in subframe n.

For example, the mobile station device 1 does not respond to the HARQ-ACK for the PDSCH transmission used to transmit system information. For example, the mobile station device 1 responds to the HARQ-ACK to the PDSCH transmission scheduled in accordance with the DCI format accompanied with the CRC scrambled with the C-RNTI.

For example, the mobile station device 1 transmits the HARQ-ACK for the PDSCH received in subframe n−6 and/or n−7 in the serving cell in which uplink-downlink configuration 1 is set in subframe n=2.

When the first uplink reference UL-DL configuration is set and the first downlink reference UL-DL configuration and the transmission direction UL-DL configuration are not set, the mobile station device 1 may specify (select or decide) a transmission direction (up/down) based on the first uplink reference UL-DL configuration.

When the first uplink reference UL-DL configuration and the first downlink reference UL-DL configuration are set and the transmission direction UL-DL configuration is not set, the mobile station device 1 may specify (select or decide) a transmission direction (up/down) based on the first downlink reference UL-DL configuration.

In the serving cell in which the second information is not received, the first downlink reference UL-DL configuration may not be defined. In this case, the mobile station device 1 and the base station device 3 may perform a process to be performed based on the above-described first downlink reference UL-DL configuration based on the first uplink reference UL-DL configuration (serving cell UL-DL configuration). The serving cell in which the second information is not received is a serving cell in which the dynamic TDD is not set.

For example, when one primary cell and one secondary cell are set, the second information in regard to the primary cell is not received, the second information in regard to the secondary cell is received, and the first uplink reference UL-DL configuration (serving cell UL-DL configuration) in regard to the primary cell and the first downlink reference UL-DL configuration in regard to the secondary cell are different, and the serving cell is the secondary cell, the second downlink reference UL-DL configuration in regard to the serving cell (the secondary cell) may be set based on the pair formed by the first uplink reference UL-DL configuration in regard to the other serving cell (the primary cell) and the first downlink reference UL-DL configuration in regard to the serving cell (the secondary cell).

For example, when one primary cell and one secondary cell are set, the second information in regard to the primary cell is not received, the second information in regard to the secondary cell is received, and the first uplink reference UL-DL configuration (serving cell UL-DL configuration) in regard to the primary cell and the first downlink reference UL-DL configuration in regard to the secondary cell are different, the corresponding second downlink reference UL-DL configuration may be used in each of two serving cells to specify (select or decide) the correspondence between subframe n in which the PDSCH is disposed and subframe n+k with which the HARQ-ACK corresponding to the PDSCH is transmitted.

For example, when one primary cell and one secondary cell are set, the second information in regard to the primary cell is not received, the second information in regard to the secondary cell is received, and the first uplink reference UL-DL configuration (serving cell UL-DL configuration) in regard to the primary cell and the first downlink reference UL-DL configuration in regard to the secondary cell are the same, the serving cell is the secondary cell, the corresponding first uplink reference UL-DL configuration (serving cell UL-DL configuration) may be used in the primary cell to specify (select or decide) the correspondence between subframe n in which the PDSCH is disposed and subframe n+k with which the HARQ-ACK corresponding to the PDSCH is transmitted and the corresponding first downlink reference UL-DL configuration may be used in the secondary cell to specify (select or decide) the correspondence between subframe n in which the PDSCH is disposed and subframe n+k with which the HARQ-ACK corresponding to the PDSCH is transmitted.

For example, when one primary cell and one secondary cell are set, the second information in regard to the primary cell is not received, the second information in regard to the secondary cell is received, and the first uplink reference UL-DL configuration (serving cell UL-DL configuration) in regard to the primary cell and the first downlink reference UL-DL configuration in regard to the secondary cell are different, the first uplink reference UL-DL configuration in regard to the primary cell is referred to in the primary cell UL-DL configuration in FIGS. 12 and 14.

Hereinafter, avoidance of collision of an uplink signal/channel and a downlink signal/channel will be described.

As described above, the PUSCH, the PUCCH, and the PRACH are used as the uplink physical channels. The UL RS is used as an uplink physical signal. Here, as the UL RS, two kinds of signals, the DMRS and the SRS, are used.

On the other hand, the PBCH, the PCFICH, the PDCCH, the PHICH, the EPDCCH, the PDSCH, and the PMCH are used as the downlink physical channels. The SS and the DL RS are used as downlink physical signals. Here, as the SSs, two kinds of signals, a Primary SS (PSS) and a Secondary SS (SSS), are used.

As the DLRSs, six kinds of signals, the CRS, the URSs related to the PDSCH, the DMRS related to the EPDCCH, the CSI-RS, the MBSFN RS, and the PRS, are used. The CSI-RS is classified into the normal CSI-RS, the NZP CSI-RS, and the ZP CSI-RS. The NZP CSI-RS is normally used to measure a signal (for channel measurement) when a Channel Quality Indicator (CQI) included in the CSI is calculated. On the other hand, the ZP CSI-RS included in an interference measurement (CSI-Interference Measurement (CSI-IM)) resource for the channel state information (in the CSI-IM resource) is normally used for interference measurement when the CQI is calculated.

An index of the CQI corresponds to a combination of the modulation scheme of the PDSCH and the transport block size. The mobile station device 1 informs the base station device 3 of the index of the CQI corresponding to the combination in which an error rate of the transport block does not exceed a predetermined value (for example, 0.1).

FIG. 22 is a diagram illustrating an example of collision of an uplink signal/channel and a downlink signal/channel. The base station device 3 sets reception, monitoring, or measurement of the downlink signal/channel in subframe t in the mobile station device 1. The set mobile station device 1 normally receives, monitors, or measures the downlink signal/channel in subframe t. At this time, the setting and execution of the reception, the monitoring, or the measurement of the downlink signal/channel are based on the first downlink reference UL-DL configuration.

On the other hand, the base station device 3 sets or gives an instruction of transmission of the uplink signal/channel in subframe t in or to the mobile station device 1. The set or instructed mobile station device 1 normally transmits the uplink signal/channel in subframe t. At this time, the setting or instruction and execution of the transmission of the uplink signal/channel are based on the first uplink reference UL-DL configuration.

In the TDD system, however, normally, the reception, the monitoring, or the measurement of the downlink signal/channel and the transmission of the uplink signal/channel cannot be simultaneously performed with one subframe of one cell. That is, since the first downlink reference UL-DL configuration and the first uplink reference UL-DL configuration are set and the first downlink reference UL-DL configuration and the first uplink reference UL-DL configuration are different (are not the same), collision occurs between the downlink signal/channel and the uplink signal/channel in subframe t which is the first flexible subframe (the downlink subframe in the first downlink reference UL-DL configuration and the uplink subframe in the first uplink reference UL-DL configuration).

Here, any of the above-described physical signals or physical channels can be applied as the uplink signal/channel and the downlink signal/channel.

As specific examples of the reception setting/monitoring setting of the downlink signal/channel and combinations of the downlink signals/channels, the following (A1) to (A10) can be exemplified.

(A1) Setting of the CIS-IM resource and setting of the ZP CSI-RS resource, and the ZP CSI-RS in the CSI-IM resource received in correspondence therewith (A2) Setting of the CSI-RS (or setting of the NZP CSI-RS resource) and the CSI-RS (or setting of the NZP CSI-RS resource) received in correspondence therewith (A3) Setting of downlink semi-persistent scheduling (SPS) via a dedicated RRC signaling (RRC message) and the PDSCH received in correspondence therewith (A4) Downlink Inter-Subframe Scheduling (ISS) by the downlink grant via the PDCCH or the EPDCCH and the PDSCH received in correspondence therewith (A5) Setting of the PMCH by a Multicast Control CHannel (MCCH) and the PMCH received in correspondence therewith (A6) Setting of an EPDCCH subframe pattern, and the EPDCCH and the PDCCH monitored in the subframe designated thereupon (A7) Setting of an EPDCCH subframe pattern, and the PDCCH monitored in the subframe other than the subframe designated thereupon (A8) Setting of a subframe pattern with which reception/monitoring of the CRS is not performed (or is performed), and the CRS received in the subframe (or the subframe designated thereupon) other than the subframe designated thereupon (A9) Setting related to the PRS and the PRS received in correspondence therewith (A10) Scheduling of the PUSCH by the uplink grant and scheduling of the PUSCH by the uplink SPS, and the PHICH with which the HARQ-ACK corresponding to the PUSCH transmission is received The reception setting/monitoring setting of the downlink signal/channel is not necessary, but the PBCH or the SS which can be periodically transmitted from the base station device 3 and can be periodically received by the mobile station device 1 can be likely to collide, and therefore are included in the embodiment.

When the subframe with which such a reception process is performed is the same as the subframe with which a transmission process for the uplink signal/channel is performed in the mobile station device 1, collision can be avoided by not performing (dropping/skipping) the reception process for the downlink signal/channel. As a specific example, processes (dropping process/skipping process) such as the following (B1) to (B10) on the foregoing (A1) to (A10) can be exemplified.

(B1) Interference measurement is performed to calculate the CQI based on the ZP CSI-RS in the CSI-IM excluding at least the resource in the subframe in which an uplink signal is scheduled/set in the set CSI-IM resources.

(B2) Channel measurement is performed to calculate the CQI based on the CSI-RS (or the NZP CSI-RS) in the CSI-RS (or the NZP CSI-RS) resource excluding at least the resource in the subframe in which an uplink signal is scheduled/set in the set CSI-RS (or NZP CSI-RS) resources.

(B3) When a subframe is the subframe in which the downlink grant is not received and is the subframe designated in the setting of the SPS, and is not the subframe in which a request for uplink transmission for the TDD is given rather than the management gap, the MAC layer instructs the physical layer to receive the transport block (the transport block in the downlink shared channel) in the subframe. That is, when a subframe is the subframe in which the downlink grant is not received and is the subframe designated in the setting of the SPS, but is the subframe in which a request for uplink transmission for the TDD is given, the MAC layer does not instruct the physical layer to receive the transport block (the transport block in the downlink shared channel) in the subframe.

(B4) When a subframe is the subframe in which the downlink grant is not received, is the subframe in which the downlink transmission is designated by the scheduling in accordance with the ISS, and is not the subframe in which a request for uplink transmission for the TDD rather than the management gap is given, the MAC layer instructs the physical layer to receive the transport block (the transport block in the downlink shared channel) in the subframe. That is, when the subframe is the subframe in which the downlink grant is not received and is the subframe in which the downlink transmission is designated by the scheduling in accordance with the ISS, but is the subframe in which a request for uplink transmission for the TDD is given, the MAC layer does not instruct the physical layer to receive the transport block (the transport block in the downlink shared channel) in the subframe.

(B5) The MCH is assumed to occur in the subframe excluding at least the subframe in which an uplink signal is scheduled/set in the subframe set defined in accordance with the setting of the PMCH.

(B6) When a subframe is the PDCCH subframe (the subframe in which the PDCCH or the EPDCCH is present) and is not the subframe in which a request for uplink transmission for the TDD (or the half-duplex FDD) rather than the management gap is given, the EPDCCH is monitored with the subframe during a DRX (Discontinuous Reception) active period. That is, when a subframe is the PDCCH subframe but is the subframe in which a request for uplink transmission for the TDD is given, the EPDCCH and the PDCCH is not monitored with the subframe.

(B7) When a subframe is the PDCCH subframe and is not the subframe in which a request for uplink transmission for the TDD (or the half-duplex FDD) rather than the management gap is given, the PDCCH is monitored with the subframe during a DRX (Discontinuous Reception) active period. That is, when a subframe is the PDCCH subframe but is the subframe in which a request for uplink transmission for the TDD is given, the PDCCH is not monitored with the subframe.

(B8) Based on only the CRS other than the CRS in the subframe in which an uplink signal is scheduled/set in the CRS in the subframe (or the subframe designated thereupon) other than the subframe designated in accordance with the setting of the subframe pattern with which reception/monitoring of the CRS is not performed (or is performed), measurement (channel measurement or interference measurement) is performed to calculate the CQI.

(B9) Based on the PRS in the subframe other than the subframe in which an uplink signal is scheduled/set in the PRS in the subframe designated in accordance with the PRS setting, measurement for positioning (geographic position) is performed.

(B10) In the TDD, when one serving cell is set in a UE and the first uplink reference UL-DL configuration is set in the serving cell, the corresponding PHICH resource is decided in the subframe subsequent by a value acquired using the first uplink reference UL-DL configuration as the UL-DL configuration of the TDD in regard to the PUSCH scheduled from the serving cell.

The reception setting/monitoring setting of the downlink signal/channel is not necessary. However, by not performing the reception process with the subframe in which an uplink signal is scheduled/set, the same advantageous effects as those of the foregoing example can also be obtained in the PBCH or the SS which can be periodically transmitted from the base station device 3 and can be periodically received by the mobile station device 1.

When a subframe is the subframe in which a request for uplink transmission for the TDD is given, the MAC layer may cause the physical layer to receive/decode the transport block in the subframe in the physical layer, instead of not instructing the physical layer to receive the transport block (the transport block in the downlink shared channel) in the subframe, so that information indicating that the reception/decoding of the transport block in the subframe fails is delivered from the physical layer to the MAC layer. The MAC layer may generate an NACK for the transport block based on the information.

Here, as specific examples of the foregoing uplink signal, the following (C1) to (C8) can be exemplified.

(C1) PUSCH transmission corresponding to the detection of the PDCCH/EPDCCH or the PHICH having the downlink control information (uplink grant) or the HARQ-ACK indicating the assignment of the PUSCH (C2) PUSCH transmission corresponding to detection of the PDCCH/EPDCCH having the downlink control information giving an instruction of feedback of the CSI (C3) PUCCH transmission or PUSCH transmission including the HARQ-ACK for the reception of the PDCCH giving an instruction to release the PDSCH or the SPS (C4) Non-collision-based PRACH transmission in a random access procedure activated in accordance with a PDCCH order (C5) SRS transmission corresponding to the detection of the PDCCH/EPDCCH having the downlink control information giving an instruction to transmit the SRS (C6) PUCCH transmission or PUSCH transmission including the CSI by setting periodic feedback of the CSI (C7) SRS transmission by the periodic SRS transmission (C8) PUSCH transmission by setting PUSCH transmission of the SPS for uplink The mobile station device 1 can avoid collision by not performing the reception process for a downlink signal/channel, and thus can normally perform the transmission process for an uplink signal/channel. On the other hand, the mobile station device 3 can continue communication when the mobile station device 1 not perform the reception process for a downlink signal/channel and normally performs the transmission process for an uplink signal/channel.

The case in which the mobile station device 1 does not perform the reception process when the subframe with which the reception process for a downlink signal/channel is performed is the same as the subframe with which the transmission process for an uplink signal/channel is performed has been described above. Conversely, collision can be avoided by not performing (dropping/skipping) the transmission process for an uplink signal/channel when the subframe with which the reception process for a downlink signal/channel is performed is the same as the subframe with which the transmission process for an uplink signal/channel is performed.

As the transmission instruction/setting of an uplink signal/channel with which the transmission process is not performed and specific examples of the combination of the uplink signal/channel, for example, the foregoing (C1) to (C8) can be exemplified. As specific examples, the following processes (D1) to (D8) (dropping processes/skipping processes) on the foregoing (C1) to (C8) can be exemplified.

(D1) In the TDD, when one serving cell is set in the mobile station device 1, the first downlink reference UL-DL configuration and the first uplink reference UL-DL configuration are set in the serving cell, the first downlink reference UL-DL configuration and the first uplink reference UL-DL configuration are not the same, and a subframe is not the subframe in which the downlink signal transmission is set, the corresponding PUSCH transmission is adjusted in regard to the detection of the PDCCH/EPDCCH or the PHICH having the downlink control information indicating the assignment of the PUSCH. That is, when a subframe is the subframe in which downlink signal transmission is set, the corresponding PUSCH transmission is not adjusted in regard to detection of the PDCCH/EPDCCH or the PHICH having the downlink control information indicating the assignment of the PUSCH.

(D2) In the TDD, when a CSI request field in the PDCCH/EPDCCH is set so that an aperiodic CSI report is triggered and a subframe is not the subframe in which the downlink signal transmission is set, the uplink control information is mapped to the PUSCH. That is, when a subframe is the subframe in which the downlink signal transmission is set, the uplink control information is not mapped to the PUSCH.

(D3) In the TDD, when one serving cell is set in the mobile station device 1, the first downlink reference UL-DL configuration and the first uplink reference UL-DL configuration are set in the serving cell, the first downlink reference UL-DL configuration and the first uplink reference UL-DL configuration are not the same, and a subframe is not the subframe in which the downlink signal transmission is set, the HARQ-ACK is transmitted with the subframe in regard to the detection of the PDCCH/EPDCCH giving an instruction to transmit the PDSCH or release the downlink SPS (cancel the downlink SPS). That is, when a subframe is the subframe in which downlink signal transmission is set, the HARQ-ACK is not transmitted with the subframe in regard to the detection of the PDCCH/EPDCCH giving an instruction to transmit the PDSCH or release the downlink SPS (cancel the downlink SPS).

(D4) A subsequent effective subframe including the resource of the PARCH permitted in accordance with the PARCH setting is decided in consideration of whether the management gap occurs and the downlink signal transmission is set in the random access procedure. That is, when a subframe is the subframe in which the downlink signal transmission is set, the subframe is not decided as an effective subframe.

(D5) When the downlink signal transmission is set in a certain subframe, a terminal has not to transmit the SRS in the subframe. However, when the subframe is the special subframe, the SRS may be transmitted in the UpPTS despite the fact that the downlink signal transmission is set in the DwPTS.

(D6) In a periodic CSI report, a terminal drops the CSI report when the CSI report and the downlink signal transmission collide in a certain subframe.

(D7) When the downlink signal transmission is set in a certain subframe, a terminal has not to transmit the SRS in the certain subframe. However, when the subframe is the special subframe, the SRS may be transmitted in the UpPTS despite the fact that the downlink signal transmission is set in the DwPTS.

(D8) When the downlink signal transmission is set in a certain subframe, the mobile station device 1 has not to transmit the PUSCH corresponding to the uplink SPS in the subframe. That is, when a subframe corresponds to the uplink grant of the uplink SPS and is the subframe in which the downlink transmission for the TDD is set, the HARQ process based on the uplink grant is not performed (the uplink grant is not delivered to an HARQ process).

Here, as specific examples of the foregoing downlink transmission, the physical signals/channels such as the above-described (A1) to (A10) can be exemplified. The reception setting/monitoring setting of the downlink signal/channel is not necessary. However, the PBCH or the SS which can be periodically transmitted from the base station device 3 and can be periodically received by the mobile station device 1 can also collide, and thus are included in the specific examples of the downlink transmission.

The mobile station device 1 can avoid collision by not performing the transmission process for the uplink signal/channel, and thus can normally perform the reception process for the downlink signal/channel. On the other hand, the base station device 3 can continue communication since the mobile station device 1 normally performs the reception process for the downlink signal/channel without performing the transmission for the uplink signal/channel.

The case in which the mobile station device 1 does not perform the reception process for the downlink signal/channel and the case in which the mobile station device 1 does not perform the transmission process for the uplink signal/channel when the uplink signal/channel and the downlink signal/channel collide in the flexible subframe, by setting the first downlink reference UL-DL configuration and the first uplink reference UL-DL configuration and causing the first downlink reference UL-DL configuration and the first uplink reference UL-DL configuration to be different, have been described.

However, it is also possible to individually decide which process is dropped depending on which uplink signal/channel and which downlink signal/channel collide as well as the case in which the dropping(skipping) process is performed depending on downlink or uplink.

For example, when the PUSCH transmission corresponding to the PDCCH or the EPDCCH and the CSI-IM resources occur in the same subframe, the interference measurement is performed to calculate the CQI based on the ZP CSI-RS in the CSI-IM resource excluding at least the CSI-IM resource in the subframe in which the uplink signal is scheduled/set in the set CSI-IM resources. That is, it is possible to drop the reception process for the ZP CSI-RS in the CSI-IM resource. On the other hand, it is possible to drop the SRS transmission when the SRS transmission set in accordance with the setting of the periodic SRS transmission and the PDSCH received in correspondence with the downlink grant via the PDCCH or the EPDCCH occur in the same subframe.

Alternatively, it is possible to individually decide which channel/signal is dropped depending on content to be transmitted even when the same uplink signal/channel and downlink signal/channel collide. For example, when the PUSCH transmission corresponding to the PDCCH or the EPDCCH and the CSI-IM resources occur in the same subframe and content to be transmitted with the PUSCH is message 3 (an uplink message corresponding to the uplink grant included in the random access response in a collision-based random access procedure), the mobile station device 1 can drop the reception process for the ZP CSI-RS in the CSI-IM resources. On the other hand, when the content to be transmitted with the PUSCH is not message 3, the mobile station device 1 can drop the PUSCH transmission. Conversely, when the content is message 3, the base station device 3 can be configured to receive the PUSCH. When the content is not message 3, the base station device 3 can be configured not to receive the PUSCH. Alternatively, important information such as message 3 may be appropriately scheduled by a scheduler in the base station device 3 so that the important information is not dropped.

Alternatively, it is possible to individually decide which process is dropped in accordance with dynamic scheduling in which the mobile station device 1 performs reception/transmission according to detection of the PDCCH/EPDCCH, or static or semi-static scheduling which is set with RRC signaling (RRC message). For example, when the PUSCH transmission corresponding to detection of the PDCCH/EPDCCH or the PHICH having the downlink control information indicating the PUSCH assignment and the CSI-IM resources set with dedicated RRC signaling collide, the dynamically scheduled PUSCH transmission is performed and the reception process for the ZP CSI_RS in the CSI-IM resources can be dropped.

Here, each example has been given as the combination example, but the above-described collision avoidance method can be applied to collision in accordance with any combination of the foregoing (A1) to (A10) and the foregoing (C1) to (C8). At this time, any of the processes of the foregoing (B1) to (B10) and the foregoing (D1) to (D8) can be used as a dropping process.

The NZP CSI-RS and the ZP CSI-RS may be transmitted in a slot of a subframe instructed as the downlink subframe in accordance with the first downlink reference UL-DL configuration.

The base station device 3 may also transmit information indicating validness or invalidness of the CSI-RS in the special subframe to the mobile station device 1. When the information indicates the validness, the mobile station device 1 may consider that the NZP CSI-RS and the ZP CSI-RS are transmitted in the DwPTS of the subframe instructed as the special subframe in accordance with the first downlink reference UL-DL configuration.

The mobile station device 1 considers that the NZP CSI-RS and the ZP CSI-RS are not transmitted in the subframe instructed as the uplink subframe in accordance with the first downlink reference UL-DL configuration.

The mobile station device 1 considers that the NZP CSI-RS and the ZP CSI-RS are not transmitted in the GP and the UpPTS of the subframe instructed as the special subframe in accordance with the first downlink reference UL-DL configuration.

When the invalidness is instructed in accordance with the information indicating the validness or the invalidness of the CSI-RS in the special subframe, the mobile station device 1 considers that the NZP CSI-RS and the ZP CSI-RS are not transmitted in the DwPTS of the subframe instructed as the special subframe in accordance with the first downlink reference UL-DL configuration.

The mobile station device 1 considers that the NZP CSI-RS and the ZP CSI-RS are not transmitted in the subframe in which the transmission of the NZP CSI-RS and the ZP CSI-RS collides with the transmission of the SS, the PBCH, or the SIB1.

The mobile station device 1 considers that the NZP CSI-RS and the ZP CSI-RS are not transmitted in the subframe in which transmission of a paging message is set.

That is, when the invalidness is instructed in accordance with the information indicating the validness or the invalidness of the CSI-RS in the special subframe, the mobile station device 1 considers that the ZP CSI-RS is not transmitted in regard to the CSI-IM resource set in the DwPTS of the subframe instructed as the special subframe in accordance with the first downlink reference UL-DL configuration.

That is, when the validness is instructed in accordance with the information indicating the validness or the invalidness of the CSI-RS in the special subframe, the mobile station device 1 considers that the ZP CSI-RS is transmitted in regard to the CSI-IM resource set in the DwPTS of the subframe instructed as the special subframe in accordance with the first downlink reference UL-DL configuration.

Hereinafter, examples of embodiments of the present invention will be described.

(I) In a first example of the embodiment, the mobile station device 1 sets resources (for example, the CSI-IM resources) used to calculate a channel quality indicator, transmits an uplink signal in the subframe in which the uplink signal is scheduled and/or set to the base station device 3, and performs measurement to calculate the channel quality indicator based on a downlink signal (for example, the ZP CSI-RS) in the resource excluding at least the resource in the subframe in which the uplink signal is scheduled and/or set in the resources.

(II) In a second example of the embodiment, the mobile station device 1 sets resources used to calculate a channel quality indicator, receives information (third information) giving an instruction of a transmission direction (transmission direction UL-DL) of the subframe from the base station device 3, and performs measurement to calculate the channel quality indicator based on a downlink signal included in the resource excluding at least the resource in the subframe in which the transmission direction is uplink in accordance with the information. Thus, it is not necessary to perform the scheduling and setting in consideration of collision of the uplink signal/channel and the downlink signal/channel in the base station device 3.

(III) In a third example of the embodiment, the mobile station device 1 sets resources used to calculate a channel quality indicator, receives information indicating validness or invalidness of the resources in the special subframe, and performs measurement to calculate the channel quality indicator based on a downlink signal included in the resource excluding at least the resource in the special subframe in the resources when the validness of the resources in the subframe is not instructed in accordance with the information.

(IV) In a fourth example of the embodiment, the mobile station device 1 sets resources used to calculate a channel quality indicator and drops transmission of an uplink signal in a subframe when the uplink signal is scheduled or set in the subframe in which the resources are set.

(V) In a fifth example of the embodiment, the mobile station device 1 sets resources used to calculate a channel quality indicator, performs transmission via a physical uplink shared channel in a subframe in which the resources are set when the physical uplink shared channel used to transmit an uplink shared channel including random access message 3 is scheduled in the subframe, and drops the transmission via the physical uplink shared channel in the subframe when the physical uplink shared channel used to transmit the uplink shared channel including no random access message 3 is scheduled in the subframe in which the resources are set.

(VI) In the fifth example of the embodiment, the mobile station device 1 performs measurement to calculate the channel quality indicator based on a downlink signal included in the resource excluding at least the resource in the subframe in which the physical uplink shared channel used to transmit the uplink shared channel including random access message 3 is scheduled in the resources.

(VII) In the fifth example of the embodiment, the base station device 3 sets the resources used to calculate the channel quality indicator in the mobile station device 1, schedules the physical uplink shared channel used to transmit the uplink shared channel including random access message 3 in the subframe in which the resources are set, and receives the uplink shared channel including random access message 3 via the physical uplink shared channel in the subframe in which the resources are set.

(VIII) In the fifth example of the embodiment, the base station device 3 does not perform the reception process for the uplink shared channel including a message other than random access message 3 via the physical uplink shared channel in the subframe in which the resources are set.

(IX) In the sixth example of the embodiment, the base station device 3 sets the resources used to calculate the channel quality indicator in the mobile station device 1 and schedules the physical uplink shared channel used to transmit the uplink shared channel including random access message 3 in the subframe excluding the subframe in which the resources are set.

To predict (detect) collision of the uplink signal/channel and the downlink signal/channel in one serving cell and avoid the collision, the radio resource control unit 3011 of the base station device 3 and the radio resource control unit 1011 of the mobile station device 1 can determine which process is stopped and which process is performed among the foregoing process based on the same criterion. Based on the prediction or determination, the scheduling information analysis unit 1015/scheduling unit 3015 schedules the transmission or reception process for the downlink signal/channel or the uplink signal/channel. Based on the scheduling of the transmission or reception process, the control unit 103/303 controls which transmission or reception process is performed which transmission or reception process is not performed in the transmission unit 107/305 and the reception unit 105/307.

Of the forgoing processes, for example, the setting of the CSI-IM resources, the setting of the ZP CSI-RS resources, the setting of the CSI-RS, the setting of the NZP CSI-RS resources, the setting of the downlink SPS, the setting of the PMCH, the setting of the EPDCCH subframe pattern, the setting of the subframe pattern in which the reception/monitoring of the CRS is not performed (or performed), the setting of the PRS, the setting of the uplink SPS, the setting of the periodic feedback of the CSI, and the setting of the periodic SRS transmission may be performed by the radio resource control unit 1011 of the mobile station device 1 under an instruction of the radio resource control unit 3011 of the base station device.

Of the foregoing processes, for example, the interference measurement, the channel measurement, the calculation of the CQI or the CSI, or the measurement of the PRS may be performed by the channel measurement unit 1059 of the mobile station device 1.

Of the foregoing processes, the first downlink reference UL-DL configuration and the first uplink reference UL-DL configuration may be performed by the subframe setting unit 1013 of the mobile station device 1 under an instruction of the subframe configuration unit 3013 of the mobile station device 3.

Of the foregoing processes, the transmission and reception (including the monitoring) of the downlink signal/channel may be performed respectively by the transmission unit 307 of the base station device 3 and the reception unit 105 of the mobile station device 1. The transmission and reception of the uplink signal/channel may be performed respectively by the transmission unit 107 of the mobile station device 1 and the reception unit 305 of the base station device 3.

A program operated in the base station device 3 and the mobile station device 1 according to the invention may be a program (a program causing a computer to function) controlling a central processing unit (CPU) so that the functions of the foregoing embodiment related to the invention are realized. Information handled in these devices is temporarily accumulated in a random access memory (RAM) at the time of processing the information, the information is subsequently stored in any of various read-only memories (ROMs) such as flash ROMs or a hard disk drive (HDD), is read by the CPU, as necessary, and is corrected and written.

Parts of the mobile station device 1 and the base station device 3 according to the above-described embodiment may be realized by a computer. In this case, the parts may be realized by recording a program realizing the control function in a computer-readable recording medium, reading the program recorded in the recording medium to a computer system, and executing the program.

The "computer system" mentioned herein is a computer system internally included in the mobile station device 1 or the base station device 3 and is assumed to include an OS or hardware such as a peripheral device. The "computer-readable recording medium" refers to a portable medium such as a flexible disk, a magneto-optical disc, a ROM, or a CD-ROM or refers to a storage device such as a hard disk internally included in a computer system.

The "computer-readable recording medium" may include a medium that retains a program dynamically in a short time, such as a communication line when a program is transmitted via a network such as the Internet or a communication line such as a telephone line and a medium that retains a program for a given time, such as a volatile memory inside a computer system serving as a server or a client in this case. The program may be a program that realizes some of the above-described functions or may be a program that can realize the above-described functions in a combination with a program already recorded in a computer system.

The base station device 3 according to the above-described embodiment can be realized as a collective (device group) formed by a plurality of devices. Each of the devices forming the device group may include some or all of the functions or the function blocks of the base station device 3 according to the above-described embodiment. Each device may have each of the general functions or each of the function blocks of the base station device 3 as the device group. The mobile station device 1 according to the above-described embodiment can also communicate with base station devices serving as a collective.

The base station device 3 according to the above-described embodiment may be an Evolved Universal Terrestrial Radio Access Network (EUTRAN). The base station device 3 according to the above-described embodiment may have some or all of the functions of a higher node of an eNodeB.

Parts or all of the terminal device 1 and the base station device 3 according to the above-described embodiment may be realized as an LSI which is typically an integrated circuit or may be realized as a chip set. The function blocks of the terminal device 1 and the base station device 3 may be individually realized as chips, or some or all of the function blocks may be integrated to be realized as chips. A method of realizing an integrated circuit is not limited to an LSI, but may be realized as a dedicated circuit or a general-purpose processor. When a technology for realizing an integrated circuit substituted with an LSI with an advance in a semiconductor technology appears, an integrated circuit realized by the technology can also be used.

In the above-described embodiment, the terminal device or the communication device has been described as an example, but the present invention is not limited thereto. The present invention can also be applied to stationary or non-portable electronic devices installed indoors or outdoors, for example, terminal devices or communication devices such as AV devices, kitchen devices, cleaning and washing devices, air conditioners, office devices, automatic vending machines, or other life appliances.

The embodiments of the present invention have been described above in detail with reference to the drawings, but specific configurations are not limited to the embodiments and include design configurations or the like within the scope of the present invention without departing from the gist of the present invention. The present invention can be modified in various ways within the scope described in the claims and embodiments obtained by appropriately combining the technical means disclosed in other embodiments are also included in the technical range of the invention. Configurations in which elements described in the embodiments and having the same advantages are substituted with each other are also included.

DESCRIPTION OF REFERENCE NUMERALS 1 (1A, 1B, 1C) MOBILE STATION DEVICE
3 BASE STATION DEVICE
101 HIGHER LAYER PROCESSING UNIT
103 CONTROL UNIT
105 RECEPTION UNIT
107 TRANSMISSION UNIT
301 HIGHER LAYER PROCESSING UNIT
303 CONTROL UNIT
305 RECEPTION UNIT
307 TRANSMISSION UNIT
1011 RADIO RESOURCE CONTROL UNIT
1013 SUBFRAME CONFIGURATION UNIT
1015 SCHEDULING INFORMATION ANALYSIS UNIT
1017 DRX CONTROL UNIT
3011 RADIO RESOURCE CONTROL UNIT
3013 SUBFRAME CONFIGURATION UNIT
3015 SCHEDULING UNIT
3017 DRX CONTROL UNIT

The invention claimed is:

1. A terminal device configured with a serving cell, the terminal device comprising:
configuring circuitry configured and/or programmed to configure an interference measurement resource and a resource for a zero power channel-state information-reference signal (CSI-RS);
receiving circuitry configured and/or programmed to receive first information which indicates a first uplink/downlink (UL/DL) configuration, second information which indicates a second UL/DL configuration, and third information which indicates a third UL/DL configuration;
measuring circuitry configured and/or programmed to derive an interference measurement for computing a channel quality indicator (CQI) value, based on the zero power CSI-RS within the interference measurement resource within a subframe that is indicated as a downlink subframe by the third UL/DL configuration; and
transmitting circuitry configured and/or programmed to transmit a physical uplink shared channel (PUSCH) corresponding to a physical downlink control channel (PDCCH) based on an uplink-reference UL/DL configuration, wherein
the zero power CSI-RS is assumed not to be transmitted in downlink pilot time slots (DwPTS) of special subframes indicated by the second UL/DL configuration,
the transmitting circuitry is configured and/or programmed to transmit a hybrid automatic repeat request-acknowledgement (HARQ-ACK) corresponding to a physical downlink shared channel (PDSCH) based on a downlink-reference UL/DL configuration,
the first UL/DL configuration is the uplink-reference UL/DL configuration,
the second UL/DL configuration is the downlink-reference UL/DL configuration, and
the third UL/DL configuration is used for a PDCCH monitoring.

2. The terminal device according to claim 1, wherein the special subframes indicated by the second UL/DL configuration are indicated as neither a downlink subframe nor an uplink subframe by the first UL/DL configuration.

3. An integrated circuit to be mounted on a terminal device configured with a serving cell, the integrated circuit being configured to perform at least functions of:
configuring an interference measurement resource and a resource for a zero power channel-state information-reference signal (CSI-RS);
receiving first information which indicates a first uplink/downlink (UL/DL) configuration, second information which indicates a second UL/DL configuration, and third information which indicates a third UL/DL configuration;
driving an interference measurement for computing a channel quality indicator (CQI) value, based on the zero power CSI-RS within the interference measurement resource within a subframe that is indicated as a downlink subframe by the third UL/DL configuration; and
transmitting a physical uplink shared channel (PUSCH) corresponding to a physical downlink control channel (PDCCH) based on an uplink-reference UL/DL configuration, wherein
the zero power CSI-RS is assumed not to be transmitted in downlink pilot time slots (DwPTS) of special subframes indicated by the second UL/DL,
the integrated circuit is configured to further perform a function of transmitting a hybrid automatic repeat request-acknowledgement (HARQ-ACK) corresponding to a physical downlink shared channel (PDSCH) based on a downlink-reference UL/DL configuration,
the first UL/DL configuration is the uplink-reference UL/DL configuration,
the second UL/DL configuration is the downlink-reference UL/DL configuration, and
the third UL/DL configuration is used for a PDCCH monitoring.

4. A radio communication method used for a terminal device configured with a serving cell, the radio communication method comprising:

configuring an interference measurement resource and a resource for a zero power channel-state information-reference signal (CSI-RS);

receiving first information which indicates a first uplink/downlink (UL/DL) configuration, second information which indicates a second UL/DL configuration, and third information which indicates a third UL/DL configuration;

driving an interference measurement for computing a channel quality indicator (CQI) value, based on the zero power CSI-RS within the interference measurement resource within a subframe that is indicated as a downlink subframe by the third UL/DL configuration; and transmitting a physical uplink shared channel (PUSCH) corresponding to a physical downlink control channel (PDCCH) based on an uplink-reference UL/DL configuration, wherein the zero power CSI-RS is assumed not to be transmitted in downlink pilot time slots (DwPTS) of special subframes indicated by the second UL/DL configuration, the communication method further comprises transmitting a hybrid automatic repeat request-acknowledgement (HARQ-ACK) corresponding to a physical downlink shared channel (PDSCH) based on a downlink-reference UL/DL configuration, the first UL/DL configuration is the uplink-reference UL/DL configuration, the second UL/DL configuration is the downlink-reference UL/DL configuration, and the third UL/DL configuration is used for a PDCCH monitoring.

* * * * *